(12) United States Patent
Walsh et al.

(10) Patent No.: US 11,593,738 B2
(45) Date of Patent: Feb. 28, 2023

(54) QUEUE MANAGEMENT SYSTEM

(71) Applicant: Art Processors Pty Ltd, Collingwood (AU)

(72) Inventors: David Dominic Walsh, Berriedale (AU); Jacob Colin Thomas Dwyer Haslehurst, Brunswick (AU); Timothy Stroh, Hampton (AU); Nicholas Samuel Forge, Northcote (AU); Nicolas Aodhan Whyte, Fitzroy (AU)

(73) Assignee: ART PROCESSORS PTY LTD, Vic (AU)

( * ) Notice: Subject to any disclaimer, the term of this patent is extended or adjusted under 35 U.S.C. 154(b) by 281 days.

(21) Appl. No.: 16/441,708

(22) Filed: Jun. 14, 2019

(65) Prior Publication Data

US 2020/0394584 A1 Dec. 17, 2020

(51) Int. Cl.
*G06Q 10/06* (2012.01)
*G06Q 10/0631* (2023.01)

(52) U.S. Cl.
CPC ............. *G06Q 10/06316* (2013.01); *G06Q 10/063114* (2013.01)

(58) Field of Classification Search
CPC combination set(s) only.
See application file for complete search history.

(56) References Cited

U.S. PATENT DOCUMENTS

| | | | |
|---|---|---|---|
| 2008/0133283 A1 | 6/2008 | Backer et al. | |
| 2008/0222018 A1 | 9/2008 | Backer | |
| 2008/0222143 A1 | 9/2008 | Backer et al. | |
| 2008/0222144 A1 | 9/2008 | Backer et al. | |
| 2011/0307547 A1 | 12/2011 | Backer et al. | |
| 2014/0089075 A1* | 3/2014 | Sanchis | G06Q 30/0217 705/14.27 |
| 2014/0343995 A1 | 11/2014 | Backer et al. | |
| 2017/0011311 A1* | 1/2017 | Backer | G06Q 10/02 |
| 2017/0270734 A1* | 9/2017 | Geraghty | G07C 11/00 |
| 2018/0033015 A1* | 2/2018 | Opalka | G06F 16/5838 |
| 2018/0349808 A1* | 12/2018 | Sahadi | G06Q 10/047 |
| 2020/0286004 A1 | 9/2020 | Backer et al. | |

FOREIGN PATENT DOCUMENTS

| WO | 2012170958 A1 | 12/2012 |
| WO | 2015148695 A1 | 10/2015 |

* cited by examiner

*Primary Examiner* — Arif Ullah
(74) *Attorney, Agent, or Firm* — Tarolli, Sundheim, Covell & Tummino LLP

(57) ABSTRACT

The present invention provides a system that comprises a memory and a queue manager that maintains a virtual queue in the memory for a consumable event, the virtual queue defining a current order of a plurality of agents, and summons one or more agents of the plurality of agents to the consumable event, wherein the queue manager is configured to communicate with a plurality of mobile devices, each mobile device of the plurality of mobile devices associated with an agent of the plurality of agents, wherein the queue manager communicates with each mobile device in order to monitor the associated agent, and wherein the queue manager is configured to dynamically determine when to summon one or more agents of the plurality of agents in the virtual queue to the consumable event based on the monitoring of the plurality of agents.

23 Claims, 12 Drawing Sheets

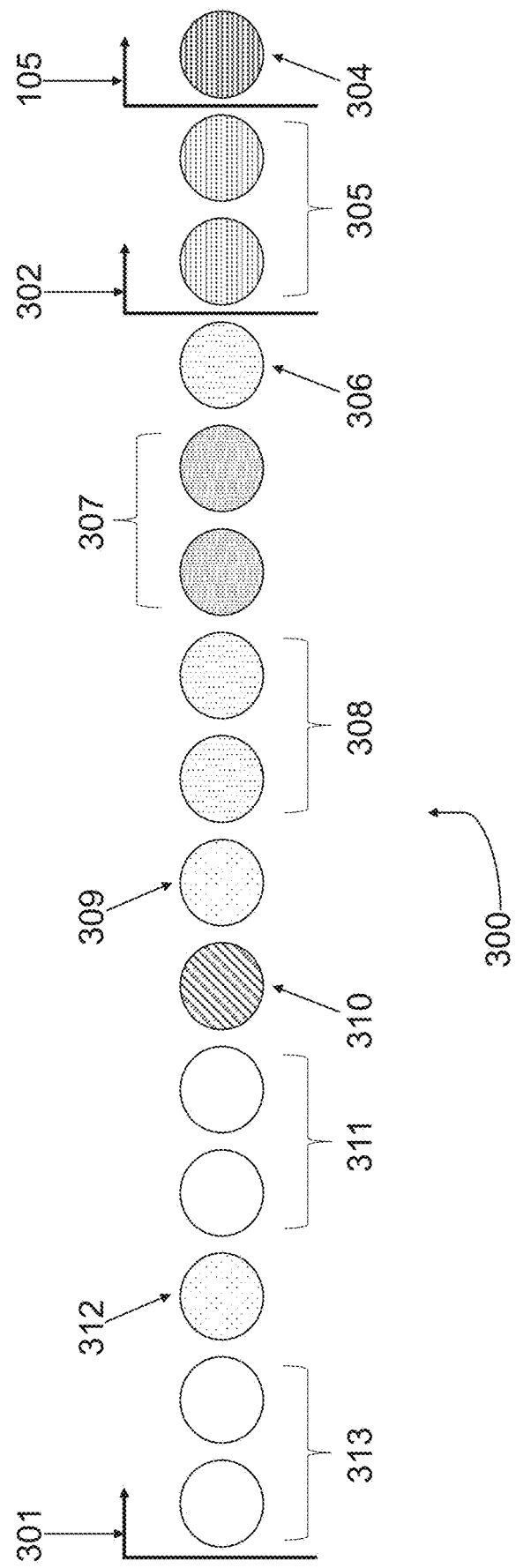

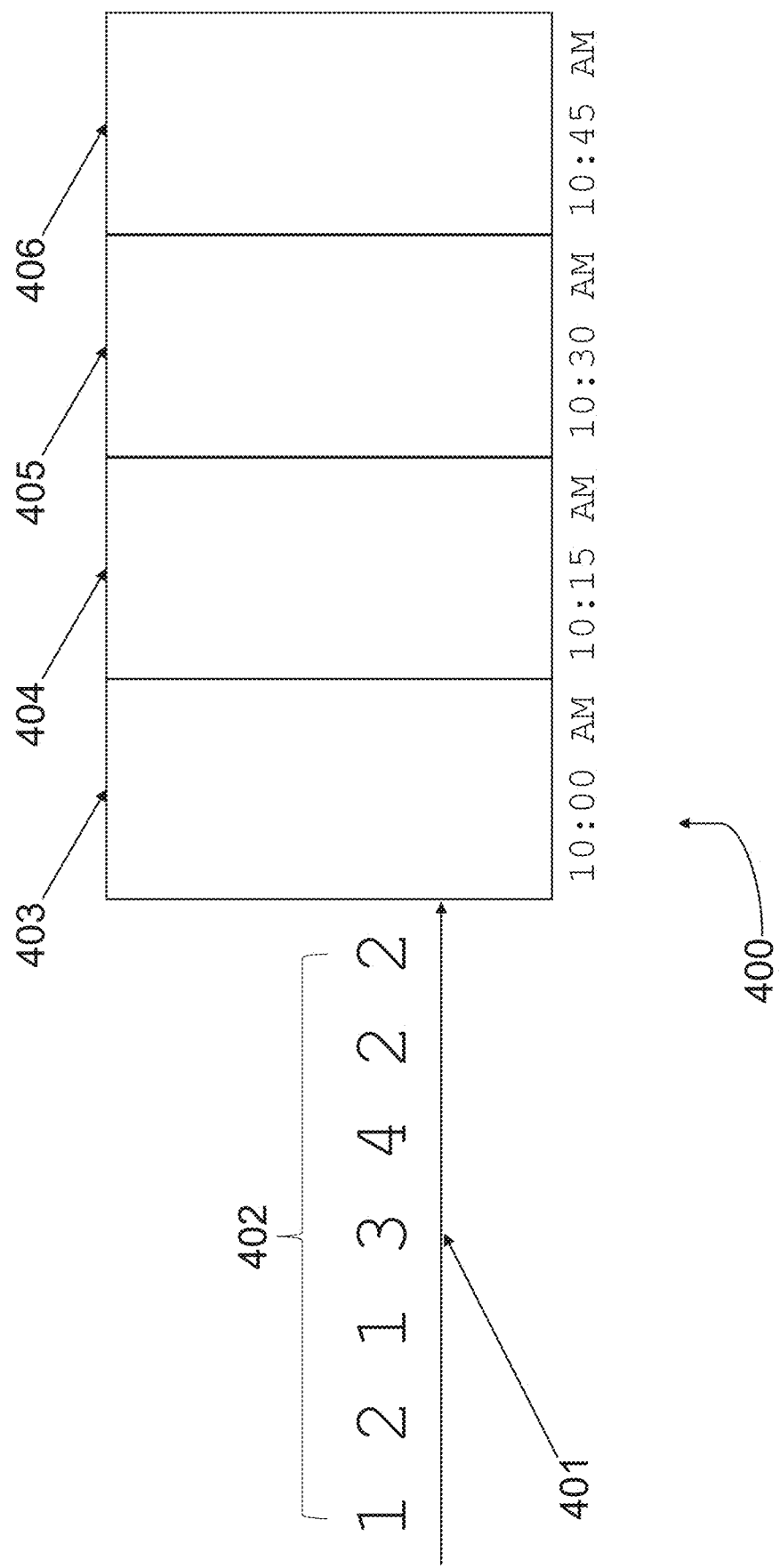

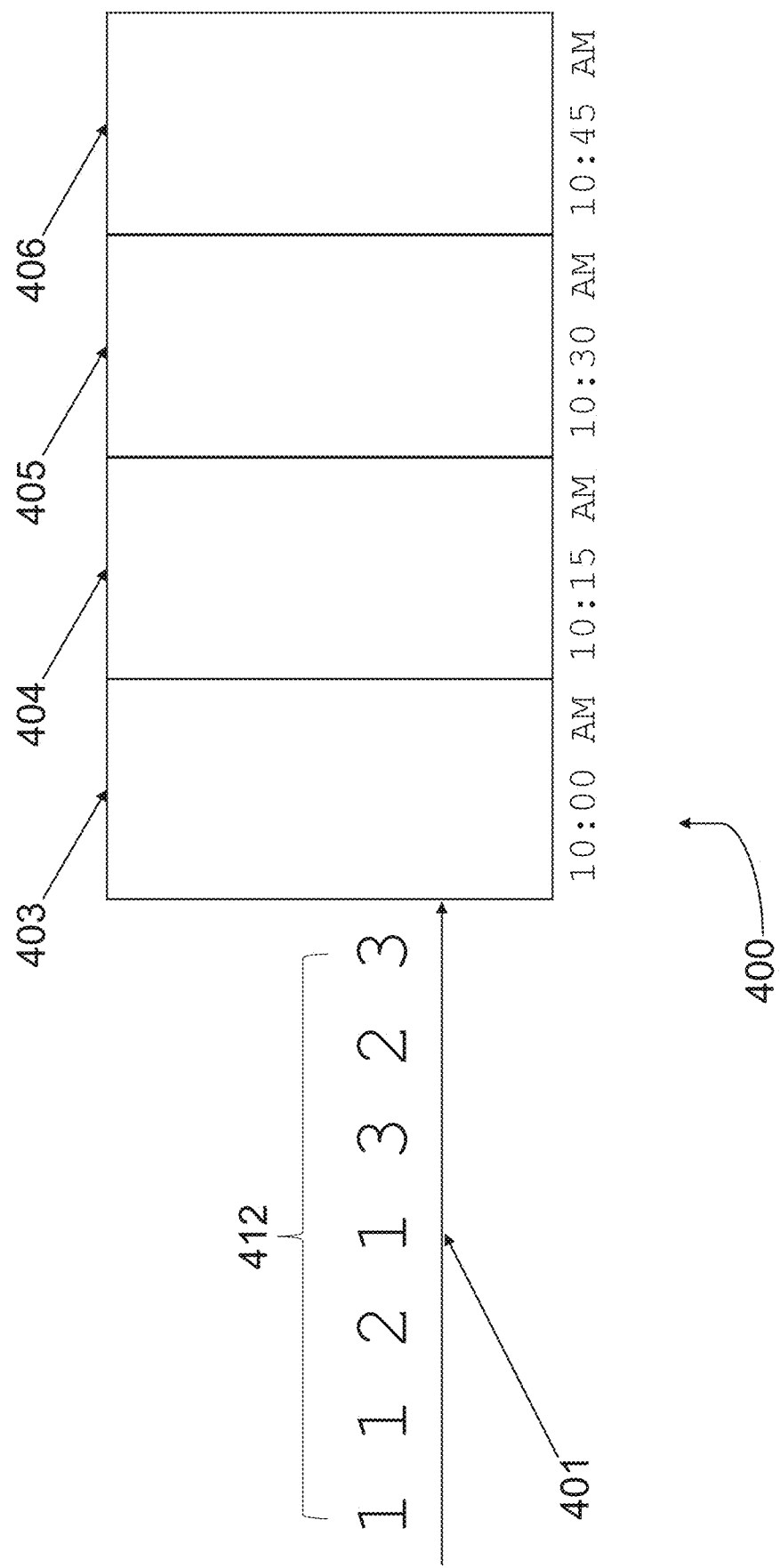

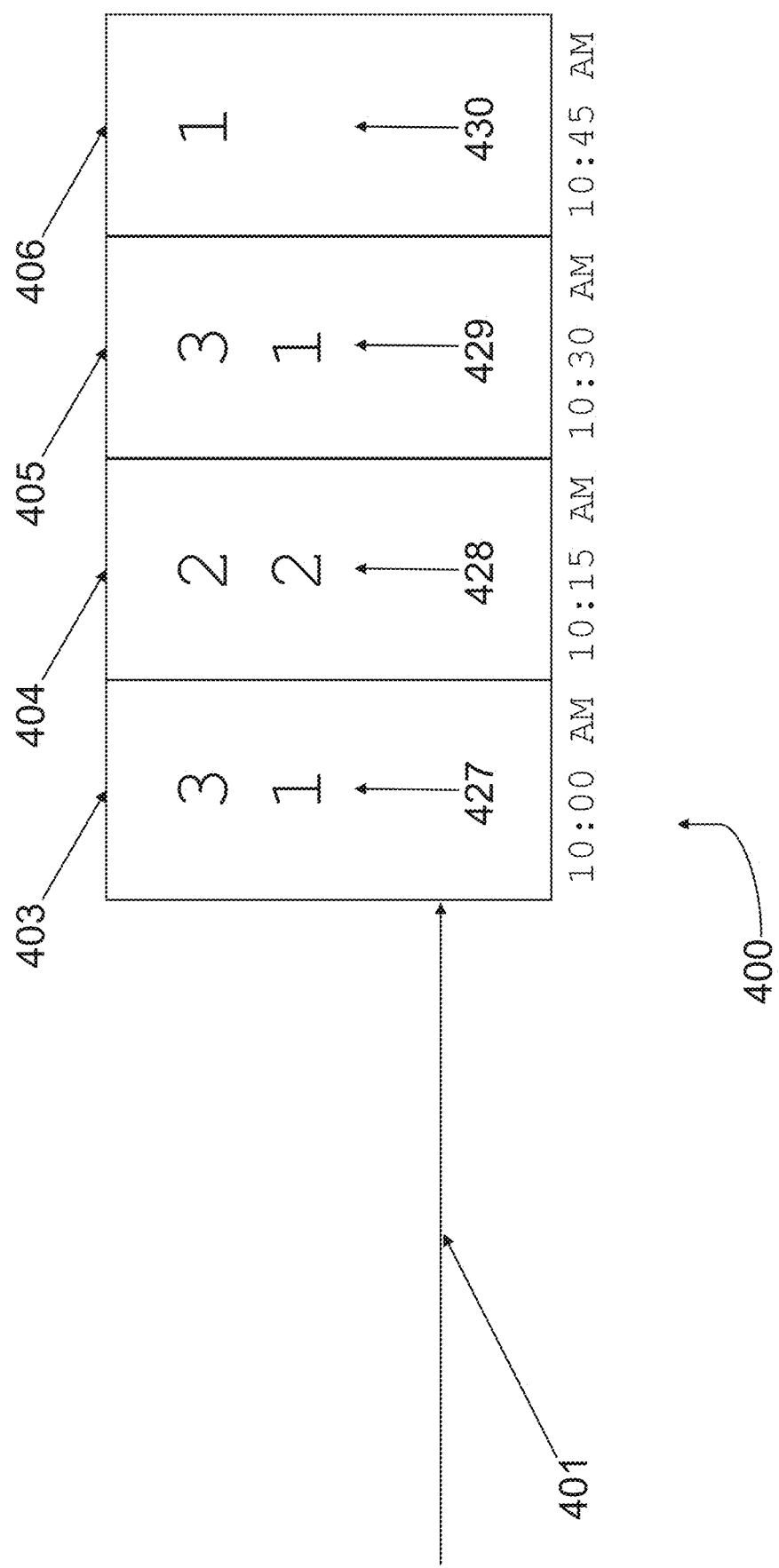

QUEUE MANAGEMENT SYSTEM

FIELD

The present application relates to a queue management system and a queue management method.

BACKGROUND

As new and popular events or attractions draw large crowds of attendees, venue management of venues hosting the events or attractions may learn that attendees are dissatisfied with the way in which the venue management handles how the events or attractions are queued for and accessed. For example, event attendees may express dissatisfaction with queue times and being forced to remain in a physical line or queue for extended lengths of time in order to access the event or attraction. At venues where attendees may join a virtual queue that allows attendees to reserve a relative position in the queue and remain in the queue for an event without needing to physically stay in a line of people in order to maintain that relative position in the queue, attendees may be dissatisfied or otherwise frustrated when they miss their window of opportunity to access a first event due to being preoccupied with something else that may require their attention or because they must leave a second activity that they have commenced while waiting their turn for the first event so as to avoid missing their place in the first queue. Attendees may also experience dissatisfaction or frustration when their time to engage in the activity arises, but the activity is too crowded to appreciate. Other inefficiencies with physical and virtual queues may also cause attendee dissatisfaction, such as increased wait times, being required to carry a device such as a pager that indicates to them that their position is not available, having to constantly check monitors for the number or code they have been allocated by a queue management system, or being required to stay within a very small proximate area to the queued event even through the expected wait times are quite lengthy.

In another example, large resorts may have buses or other transit available to transport guests to and from different facilities, activities, and events either within or external to the resort. As guests may wish to engage in a large number of activities such as playing golf, going parasailing, going to local tourist attractions, or going to restaurants, guests may need to catch a number of buses to these activities. Bus or other transit systems are typically set up such that guests must wait at a bus stop in order to get a bus that runs on a fixed schedule, but at times these buses may leave a stop empty or at capacity, wasting resources and the time of guests that must wait for another bus.

Thus, there is a need for a system that improves at least one of attendee or guest satisfaction, throughput of attendees or guests through events, utilisation of the events, and/or reduces the amount of time an attendee or guest needs to access the event.

SUMMARY OF THE INVENTION

An embodiment of the present invention provides a system that comprises: a memory; and a queue manager that maintains a virtual queue in the memory for a consumable event, the virtual queue defining a current order of a plurality of agents, and summons one or more agents of the plurality of agents to the consumable event, wherein the queue manager is configured to communicate with a plurality of mobile devices, each mobile device of the plurality of mobile devices associated with an agent of the plurality of agents, wherein the queue manager communicates with each mobile device in order to monitor the associated agent, and wherein the queue manager is configured to dynamically determine when to summon one or more agents of the plurality of agents in the virtual queue to the consumable event based on the monitoring of the plurality of agents.

Another embodiment of the present invention provides a system that comprises: a memory; and a queue manager that maintains a virtual queue in the memory for a consumable event, the virtual queue defining a current order of a plurality of a first class of agents for the one the consumable event, the queue manager configured to summon one or more agents of the plurality of the first class of agents to the consumable event, and output an instruction to one or more agents of a plurality of a second class of agents configured to perform one or more actions related to the consumable event, wherein the queue manager is configured to communicate with a plurality of mobile devices, each mobile device of the plurality of mobile devices associated with an agent of the plurality of the first class of agents and to communicate with the plurality of the second class of agents, wherein the queue manager communicates with each mobile device in order to monitor the associated agent of the plurality of the first class of agents and the queue manager communicates with each agent of the plurality of the second class of agents in order to monitor the plurality of the second class of agents, wherein the queue manager is configured to dynamically determine when to output an instruction to one or more agents of the plurality of the second class of agents to perform the one or more actions based on the monitoring of the plurality of the first class of agents and the monitoring of the plurality of the second class of agents.

Another embodiment of the present invention provides a system that comprises: a memory; and a queue manager that maintains a virtual queue in the memory for a consumable event, the virtual queue defining a current order of a plurality of a first class of agents, the queue manager configured to summon one or more agents of the plurality of the first class of agents to the consumable event, and summon one or more agents of a plurality of a second class of agents to the consumable event, the second class of agents being configured for performing an action related to the consumable event, wherein the queue manager is configured to communicate with a plurality of mobile devices, each mobile device of the plurality of mobile devices associated with an agent of the plurality of the first class of agents and to communicate with the plurality of the second class of agents, wherein the queue manager communicates with each mobile device in order to monitor the associated agent of the plurality of the first class of agents and the queue manager communicates with each agent of the plurality of the second class of agents in order to monitor the plurality of the second class of agents, wherein the queue manager is configured to dynamically determine when to summon one or more agents of the plurality of the second class of agents to the consumable event based on the monitoring of the plurality of the first class of agents, the monitoring of the plurality of the second class of agents.

Another embodiment of the present invention provides a method that comprises: maintaining, by a queue manager, a virtual queue, in a memory, for a consumable event, the virtual queue defining a current order of a plurality of agents; communicating, by the queue manager, with a plurality of mobile devices, each mobile device of the plurality of mobile devices associated with an agent of the plurality of agents, in order to monitor the associated agent; and dynamically determining, by the queue manager when to summon one or more agents of the plurality of agents in the virtual queue to the consumable event based on the monitoring of the plurality of agents.

Another embodiment of the present invention provides a method that comprises: maintaining, by a queue manager, a virtual queue, in a memory, for a consumable event, the virtual queue defining a current order of a plurality of a first class of agents; communicating, by the queue manager, with a plurality of mobile devices, each mobile device of the plurality of mobile devices associated with an agent of the plurality of the first class of agents, in order to monitor the plurality of the first class of agents; communicating, by the queue manager, with each agent of a plurality of a second class of agents in order to monitor the plurality of the second class of agents; and dynamically determining, by the queue manager, when to instruct one or more agents of the plurality of the second class of agents to perform one or more actions related to the consumable event based on the monitoring of the plurality of the first class of agents and the monitoring of the plurality of the second class of agents.

Another embodiment of the present invention provides a method that comprises: maintaining, by a queue manager, a virtual queue, in a memory, for a consumable event, the virtual queue defining a current order of a plurality of a first class of agents; communicating, by the queue manager, with a plurality of mobile devices, each mobile device of the plurality of mobile devices associated with an agent of the plurality of the first class of agents, in order to monitor the plurality of the first class of agents; communicating, by the queue manager, with each agent of a plurality of a second class of agents in order to monitor the plurality of the second class of agents, the second class of agents being for performing an action related to the consumable event; and dynamically determining, by the queue manager, when to summon one or more agents of the plurality of the second class of agents to the consumable event based on the monitoring of the plurality of the first class of agents and the monitoring of the plurality of the second class of agents.

BRIEF DESCRIPTION OF THE DRAWINGS

Example embodiments of the present invention are described with reference to the following drawings:

FIG. 3 shows an example of a dynamic queue model.

FIG. 4A shows an example of using a dynamic slotted queue model.

FIG. 4C shows another example of using the dynamic slotted queue model.

FIG. 4E shows further steps of the example of using the dynamic slotted queue model from FIG. 4D.

DETAILED DESCRIPTION

Figure 1:
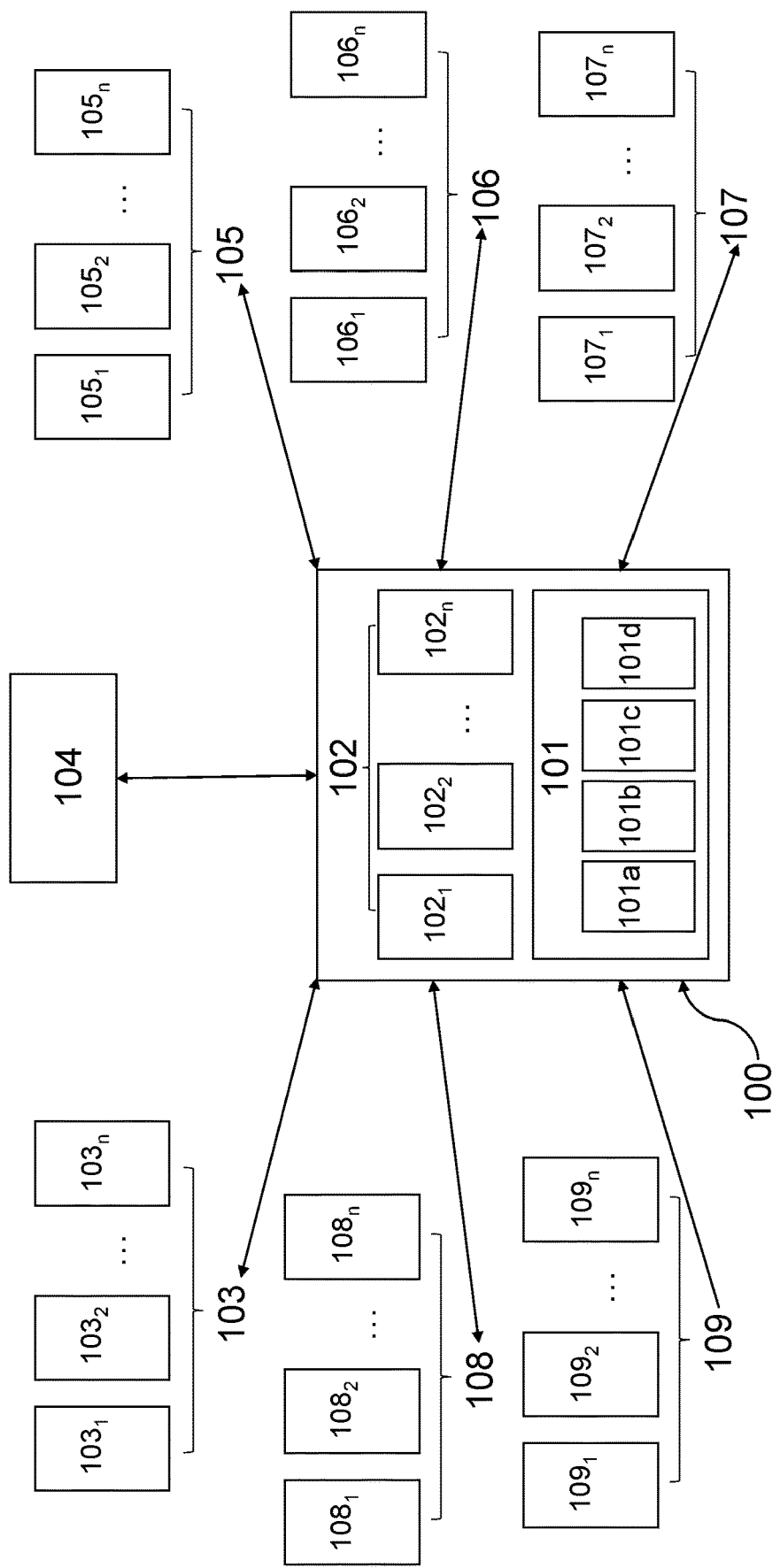
FIG. 1 shows an example of a system for dynamically updating a virtual queue and summoning agents to a consumable event.

Embodiments of the invention provide a system that enable people to join a virtual queue for events or activities. The system is configured to monitor people in the queue and summons them to the events or activities at appropriate times derived from that monitoring and other information. A person or group of people entering a venue utilising the system may opt to join a virtual queue for one or more events or activities in any of a variety of ways including a mobile device application, a website, a kiosk, or through various ticket purchasing applications or systems. In one example, the system monitors factors such as the person's location, whether they are active on their mobile device, with what applications or content they are interacting with on their mobile device, and how they are engaging with other parts of the venue or with other activities and locations in order to dynamically update the virtual queue and decide when to summon people to the event or activity. The system aims to increase the throughput of visitors through the event or activity, the utilisation of the event or activity, and the satisfaction of the people attending the event or activity.

In other embodiments the system is used to in order to determine when people or devices ancillary to the event should be deployed and to control their deployment. For example, bus drivers, cleaning personnel, vehicles such as buses, and cleaning robots can be summoned to perform an action in relation to an event or activity such that their deployment may also help increase the throughput of visitors through the event or activity, the utilisation of the event or activity, and the satisfaction of the people attending the event or activity. These people and devices may be summoned to perform actions based on dynamic parameters of the virtual queue. For example, people or devices may take advantage of space or an opening in an event when an invited guest does not arrive at the event.

Before describing the operation of the system, an overview of some components and concepts is provided to facilitate understanding of the system.

Queue Manager

The queue manager is responsible for dynamically determining when to summon an agent to a consumable event to seek to achieve optimal throughput of agents through a consumable event, optimal utilisation of the event and event space, optimal satisfaction and experience for agents, and minimal agent time loss when waiting to access the consumable event. As a result of this optimisation process, the queue manager reduces consumable event wait times. When a person joins a virtual queue for a consumable event, the person becomes an agent. Virtual queues are stored in memory, and the queue manager accesses the memory and tracks the progress of each agent through the virtual queues, the physical queues, and ultimately the consumable events. The queue manager may receive data from one or more sources including, but not limited to, agent mobile devices, consumable events, venues, queue managers of other venues, consumable event or venue ticketing systems, meteorology systems, traffic systems, public transport systems, restaurant point of sales or other kitchen management systems, building security systems, door access systems, and booking systems, in order to determine a time at which to summon an agent to a consumable event. The queue manager may communicate with the one or more data sources through one or more of Wi-Fi connections, cellular and mobile service connections, cloud communication connections, hive/swarm inter-device connections, and any other communication methods. The queue manager is able to utilise layout information representing the physical layout and architectural floor plan of a venue, the grounds of the venue, and the proximate area or town, the consumable events, and events and activities that do not require queueing for within the venue, then take this information into account when monitoring agents and determining at what time to summon one or more agents. When monitoring agents, the queue manager may also utilise data regarding the actual or expected number of agents participating in consumable events or events and activities that do not require queueing for and data regarding the impact that these agents and events have on others when determining at what time to summon one or more agents. Layout information may also include anticipated travel times between locations. The queue manager may utilise one or more Agent Scores and/or machine learning to seek to determine when would be the optimal time to summon an agent to a consumable event.

Consumable Event

A consumable event is any activity that an agent may partake in that may be queued for. Examples of consumable events include but are not limited to types of exhibits or activities at a museum, activities at a resort, shops or activities in a shopping centre, rides or attractions at an amusement or theme park, methods of transport such as boats or other vehicles, and table or entry availabilities at cafés, bars, nightclubs, or restaurants. In this way, consumable events may include events of various types such as table bookings, experience entries, seat utilisations, or other accesses to a space or area. Some consumable events may require purchasing a ticket in order to consume the event, while others may simply require that agents make their intention to consume an event known in any of a variety of ways such as by joining a queue. Some consumable events may be limited in time such that agents wishing to consume the event must do so within a prescribed period of time.

Venue

A venue is any area or space where one or more consumable events are hosted and take place. Examples of venues may include but are not limited to museums, resorts, shopping centres or malls, amusement or theme parks, and cafés, bars, or restaurants. A venue may also have any number of events or activities that do not require queueing for take place. Additionally, a venue may have indoor and outdoor areas with consumable events taking place in either space. A venue also need not be limited to just one physical location. For example, a museum's car park or parking lot that has a bus or tram terminal that allows for agents to be transported to a museum facility further up a mountain and the museum facility further up the mountain may be considered to be parts of the same venue. In some cases, a venue may also refer to a vehicle with limited riding capacity.

Agent

A first type or class of agent is a person or a group of people that has expressed an interest in partaking in a consumable event by joining a virtual queue for the event.

A second type or class of agent is a human or a non-human entity that performs actions related to the consumable event or events as directed by the system. For example, these actions may be to support the participation of the first class of agent in the consumable event or to support the continued running of the consumable event. This second class of agent may be, for example, a cleaning personnel, a bus driver, or one or more automated vehicles or robots. For the sake of clarity, when referring to agents, this disclosure refers to the first class of agents unless otherwise noted.

Additionally, the system may detect people that have not expressed an interest in partaking in a consumable event by joining a virtual queue for the event such as people visiting a museum to browse galleries and exhibits that do not specifically require their own queue. The system may detect or infer the presence of such people because the system may obtain venue entry ticket data from a venue ticketing system, presence or location data from mobile devices of the people when the people have a relevant application running on their mobile device, or when the people are detectable by a location beacon within a venue, or when people are connected to a venue's Wi-Fi, or computer vision data from security cameras that can identify unique individuals.

Virtual Queue

A virtual queue is a queue for a consumable event that an agent can join. An agent may express interest in partaking in a consumable event by joining the virtual queue through a kiosk, a mobile device application, or other internet interface. An agent may join and be in two or more virtual queues for different consumable events at the same time. Once agents join the virtual queue for a consumable event, their position in the queue is assigned sequentially and how long it takes for the agent to reach the front of the virtual queue is dynamically determined based on a variety of factors, each of which is discussed later. Instead of agents being summoned to the consumable event sequentially in the order that they joined the virtual queue, agent progression through the virtual queue is dynamically updated in order to improve throughput of agents and utilisation of the consumable event while decreasing agent time loss having to physically wait proximate to a consumable event or when accessing the consumable event. In one example, in order to accurately convey to agents their progress through the virtual queue, agents receive a dynamically updated estimated time until they are summoned to the consumable event instead of being given a queue position number. The virtual queue is considered to be full if the current time plus the current summon estimated wait time is past the closing time of the consumable event.

Summon

Once an agent is at or near the front of the virtual queue, they may be invited or summoned to the consumable event, for example to a physical queue, the entrance to the consumable event, or a specific table or vehicle. In the situation where there is a group of agents, one or more of the agents may be elected to receive the summons. Communication between the system and agents, such as updates and summons, may be communicated to agents via devices the agent is known to be interacting with or proximate to the agent, such as a kiosk or other terminal and their mobile device by one or more methods including but not limited to audio directives such as simple voice messages, audio cues, or voice messages communicated via directionally focused sound or audio spotlight techniques, textual directives such as SMS messages or pop-up notifications, haptic directives such as vibration, and visual directives such as video, an image display, or an augmented reality display. Summons may also include a query to the agent, asking the agent whether they still intend to attend the consumable event, whether they would like to postpone attending the consumable event, whether they are interested or currently consuming another event and would like this considered in determining their position in the virtual queue or the time of their summoning, or whether they would like to cancel their request to attend the consumable event.

Physical Queue

A physical queue is a queue at an entrance to a consumable event that agents must wait in prior to being allowed to enter a consumable event. An aim of embodiments of the invention is that the physical queue length is kept to a minimum, e.g., 2-5 agents long, in order to keep the wait time in the physical queue low, e.g., less than 5 minutes. In some cases, consumable events such as cafés and restaurants do not have a physical queue because agents are seated at tables once they are summoned to the consumable event after waiting in the virtual queue, so summoning an agent to the physical queue of such a consumable event would mean the same thing as summoning the agent to the consumable event.

Some consumable events may have multiple entrances and thus multiple physical queues. For consumable events with multiple entrances, the system may direct those at or near the front of the virtual queue to an appropriate physical queue, such as the entrance to the event closest to the agents or the entrance that will have vacancies shortly.

Agent Score

The system may determine an Agent Score of an agent as a method to dynamically determine when to summon the agent to a consumable event. Agent Scores are calculated values determined by the system based on a variety of different factors to determine either or both the capacity of an agent to or how likely it is that an agent will arrive at the physical location of the consumable event within a target time window. An agent can have multiple Agent Scores at any time if an agent is in multiple virtual queues. In some examples, separate Agent Scores can also be maintained for an agent's progress through a consumable event relative to an estimated target time for Agents to consume the consumable event. Such Agent Scores can be used as factors in determining summon times for other agents in the virtual queue for the respective consumable event. Agent Scores are discussed in further detail below.

Operation of the system will now be described in detail with reference to the drawings. Reference numerals referring to the same figure element may be used in multiple figures for efficiency and ease of understanding.

FIG. 1 depicts an example of a system 100 for dynamically updating a virtual queue and summoning agents to a consumable event. System 100 comprises memory 101 and one or more queue managers 102 implemented by program code running on one or more processors. In this respect, system 100 is typically implemented on a server but may also be implemented in other ways, for example, using cloud-based service hosting.

In one example, memory 101 comprises a queue database 101a, an agent records database 101b, a history database 101c, and an external influence database 101d. Memory 101 is any suitable device for storing information and/or program code and may be one or more devices. Such information could be stored across multiple devices which may be in multiple locations. Non-limiting examples of memory devices include RAM, such as DRAM and SRAM, ROM, such as EPROM or EEPROM, hard drives, solid state drives, etc. As indicated below, in some examples, cloud-based memory storage can form part of memory. The skilled person will appreciate that any other appropriate means of storing data can be used. In one example, agent records database 101b is used to store data regarding agents that are currently active 105 while history database 101d stores data for all agents that have used system 100 as well as pattern data derived from observing agents. In one example, system 100 updates history database 101d at defined intervals. For example, as part of an overnight process when venue 104 is closed.

In one example, system 100 is in data communication with one or more agent mobile devices or fixed devices 103, venue 104, data sources or sensors local to one or more consumable events 105, one or more consumable event staff devices 106, devices 107 of one or more agents of a second class of agents, and one or more location beacons 108. System 100 may also receive data from one or more external influence data sources 109. As discussed above, the system 100 may communicate with the one or more data sources 103-109 through at least one of Wi-Fi connections, cellular and mobile service connections, cloud communication connections, hive/swarm inter-device connections, and any other appropriate communication methods.

Depending on the configuration, each consumable event 105 may have a queue manager $102_1$-$102_n$ assigned to it, there may be a queue manager 102 for each venue 104 irrespective of how many queues are maintained for the venue 104, or a single queue manager 102 may manage virtual queues for multiple consumable events at one or more venues 104.

In one embodiment, system 100 may communicate bidirectionally with agent mobile devices 103 by first receiving a variety of data from the agents via queuing applications running on their mobile devices 103. In one example, people wishing to join virtual queues must first download an application capable of communicating with system 100. In one example, when people become agents by joining a virtual queue for a consumable event 105 using queueing application on their mobile device 103, agent mobile devices 103 send data to system 100, which is then stored in queue database 101a, and the agents are added to the virtual queue in the order that they joined. Additionally, the queue manager 102 may send a notification or summon to the agent's mobile device 103 through the application running on the mobile device 103, asking the agent whether the agent still intends to attend the consumable event 105. Similarly, the agent's mobile device 103 may send the agent's response to the summons back to system 100, which is processed by queue manager 102.

In an embodiment, system 100 may communicate bidirectionally with devices at known locations 103. For example, a person may join the virtual queue and become an agent through a device 103 such as a terminal. Queue manager 102 may communicate with agents via devices 103 based on agent interactions with that device 103 or another device such as a door entry swipe reader. Additionally, queue manager 102 may send a notification or summon to a device 103 through an application running on device 103, asking the agent whether the agent still intends to attend the consumable event 105. Similarly, the device 103 may send the agent's response to the summons back to system 100, which is processed by queue manager 102. For example, an agent in a virtual queue for a restaurant with a mobile device 103 that is out of batteries may decide to return to their hotel room to rest and charge their mobile device 103 while waiting to be summoned to the restaurant. In this example, because the queue manager knows that the agent's mobile device 103 is turned off, the agent is staying at a hotel due to a hotel mobile application previously communicating such data to the queue manager 102, and that the agent is in their hotel room because the queue manager has received a notification from the hotel security system that the agent's room has been accessed, a summons may appear on a television or another device 103 in the agent's hotel room, notifying the agent that they may proceed to the restaurant if they accept the summons.

Queue manager 102 may also receive other data from the agent's mobile device 103 that the queue manager 102 can use to determine when to summon the agent. For example, data regarding the agent's mobile device 103 battery level via a power monitoring application, food or drink the agent has ordered via a food ordering application, whether the agent has joined the virtual queue for another consumable event 105 via the queueing application, how the agent has interacted with other consumable events 105 or other events or activities that do not require queueing for in the venue 104, and other sources. When queue manager 102 does not receive any data from any application of the agent's mobile device 103 for a period of time, e.g., 30 minutes, queue manager 102 may determine that the agent's mobile device 103 is asleep. All of the data that the agent's mobile device 103 sends to queue manager 102 may be stored in a record for that agent in the agent records database 101b.

Queue manager 102 may learn agent preferences from how agents interact with their mobile device 103, how agents interact with consumable events 105 or other events or activities that do not require queueing for in the venue 104, and agent location and movement data. Queue manager 102 may track an agent's location and movement data through the agent's mobile device 103 in a number of ways including location beacons 108 within the venue 104, Wi-Fi triangulation, GPS, near-field communication, sequencing estimation, proprietary location tracking services as mobile device 103 applications, dead reckoning estimation, the agent interacting with entities or devices at known locations, computer vision, or other wireless communication methods. Agent preference, location, and movement data may also be sent by an agent's mobile device 103 to queue manager 102 and stored by agent records database 101b and processed by queue manager 102.

Queue manager 102 updates the agent's Agent Score, discussed in further detail below, based on how an agent interacts with their mobile device 103, what preferences the agent may have as learned by, and agent location and movement data, which impacts when queue manager 102 will summon the agent to the consumable event 105.

As indicated above, system 100 may first receive data from agent mobile devices or other devices 103 when the associated agents join the virtual queues for a consumable event 105 and store this data in queue database 101a. System 100 may also receive data from agent mobile devices 103 and store the received data in agent records database 101b of memory 101. Agent records database 101b is used to compile information regarding agents currently in virtual queues for consumable events 105; queue manager 102 may then access agent records database 101b to determine an agent's Agent Score. Although agents are ordered in the virtual queue sequentially based on when they joined the virtual queue, as described further below, queue manager 102 may then use Agent Scores to determine the likelihood of each agent in the virtual queue arriving at the consumable event when summoned and then dynamically adjust when to summon an agent based on their Agent Scores. Queue manager 102 may then access queue database 101a and update the Agent Score fields of each agent in the virtual queue and use the current set of Agent Scores to determine when to summon an agent to the consumable event 105.

Also, as indicated above, system 100 may also store the agent data discussed above in history database 101c. Queue manager 102 may access history database 101c, which stores past agent behaviour, such as movement patterns within the venue 104 and consumable events 105, alongside utilising machine learning and artificial intelligence to process and develop predictive agent behaviour or patterns. System 100 may use machine learning instead of or alongside Agent Score determinations to improve agent throughput through consumable events 105 and utilisation of consumable events 105.

Aside from summoning the agent, queue manager 102 may also communicate with agent mobile devices 103 for other purposes such by sending the mobile devices 103 suggestions for consumable events 105 or other events or activities that do not require queueing for, some of which may not be restricted to venue 104, based on the agents' preferences.

System 100 may also communicate bidirectionally with venue 104 in a number of ways. For example, venue 104 may provide system 100 with venue headcount data, venue ticket sales data, physical layout and floorplan data, security camera data, and other venue data that may be pertinent to operation of the venue, which may be stored in agent database 101b and history database 101c. Queue manager 102 may access these databases and process the data from venue 104 to determine, for example, the density of agents and people not queued for events or activities within the venue and take this data into account when calculating Agent Scores.

System 100 may also communicate with sensors, terminals, kiosks or local data sources in the area, venue, and at one or more consumable events 105. For example, a computer at a consumable event 105 may maintain schedule data for the event, seating occupancy for the event, or food orders for a restaurant and transfer the data to system 100 periodically so that queue manager 102 may control the physical queue summon timing for the consumable event 105. Additionally, although agents may interact with a consumable event 105 via their mobile device 103, such as "liking" the event or some element of the event, consumable events 105 may have their own feedback terminal or kiosk at the exit of the consumable event 105 where agents may rate the consumable event. System 100 may receive this data and store it into agent database 101b in order to have queue manager 102 process the data and use it where necessary, such as updating an agent's position in a virtual queue, Agent Score, preferences or using "likes" as an indication that a consumable event 105 is well-received and factor that into machine learning predicting agent behaviour in time spent to consume the consumable event 105. An agent may also be monitored when they use a key card, or other form of access device to enter a facility or room or utilise a kiosk or device 103 in another location to provide system 100 with knowledge of their location. Consumable events 105 may also collect data from an agent via their mobile device 103, such as tracking the mobile device 103 location within the consumable event 105, and send system 100 data regarding the capacity or density of the agents in the consumable event 105, the rate at which agents are consuming the consumable event 105, and average rates at which agents have moved through the consumable event 105 before in the past. System 100 may communicate agent data to the local computer at consumable event 105, indicating that certain agents have been summoned to the consumable event.

In conjunction with system 100 sending agent data to the consumable event 105, system 100 may also send agent data to consumable event staff and their devices 106 in order to keep the staff aware of the incoming number of agents and their likely time of arrival at a consumable event. In some examples, consumable event staff may use this information in order to use their discretion to let agent into the consumable event 105 if doing so would not impact the flow of the virtual queue. Consumable event staff may also communicate with system 100 via consumable event staff devices 106 in the event of needing to add people, such as VIPs, to the consumable event immediately, or in the event of consumable event 105 malfunction and closure or other emergencies.

System 100 may also communicate bidirectionally with devices of agents of a second class of agents 107. Communication systems in a self-driving bus or cleaning robot and devices of bus drivers and cleaning personnel are examples of as devices of agents of a second class of agents 107. Like agent mobile devices 103, devices of agents of the second class of agents 107 may transfer data to system 100 regarding their location and movement path or rate of movement. The devices of agents of the second class of agents 107 may also transfer itinerary and schedule data to system 100, so that the system 100 can determine when the agent of the second class of agents should be summoned and what the agent of the second class of agents should do once summoned. Examples of operation of these agents of the second class of agents are discussed below.

System 100 may also communicate bidirectionally with location beacons 108. Location beacons 108 may determine the distance between an agent mobile device and the beacon and relay this data to system 100. Conversely, system 100 may ping a location beacon 108 and have the location beacon 108 check if a specific agent or group of agents are within the beacon 108 detection range. As discussed above, this agent location data may be stored in the agent database 101b and the history database 101c.

System 100 may also receive data from one or more external influence sources 109. For example, system 100 may receive dynamic inclement weather data from a weather data source, traffic data from a traffic data source, and public transport data from a public transport data source. System 100 may store this data from external influence sources 109 in external influence database 101d, which may be accessed by queue manager 102 in conjunction with agent database 101b and history database 101c to recalculate and update an agent's Agent Score, analyse data regarding how external influences affect transit times to a location or venue 104 or consumable event 105 over time, and access and update queue database 101a accordingly.

Figure 2:
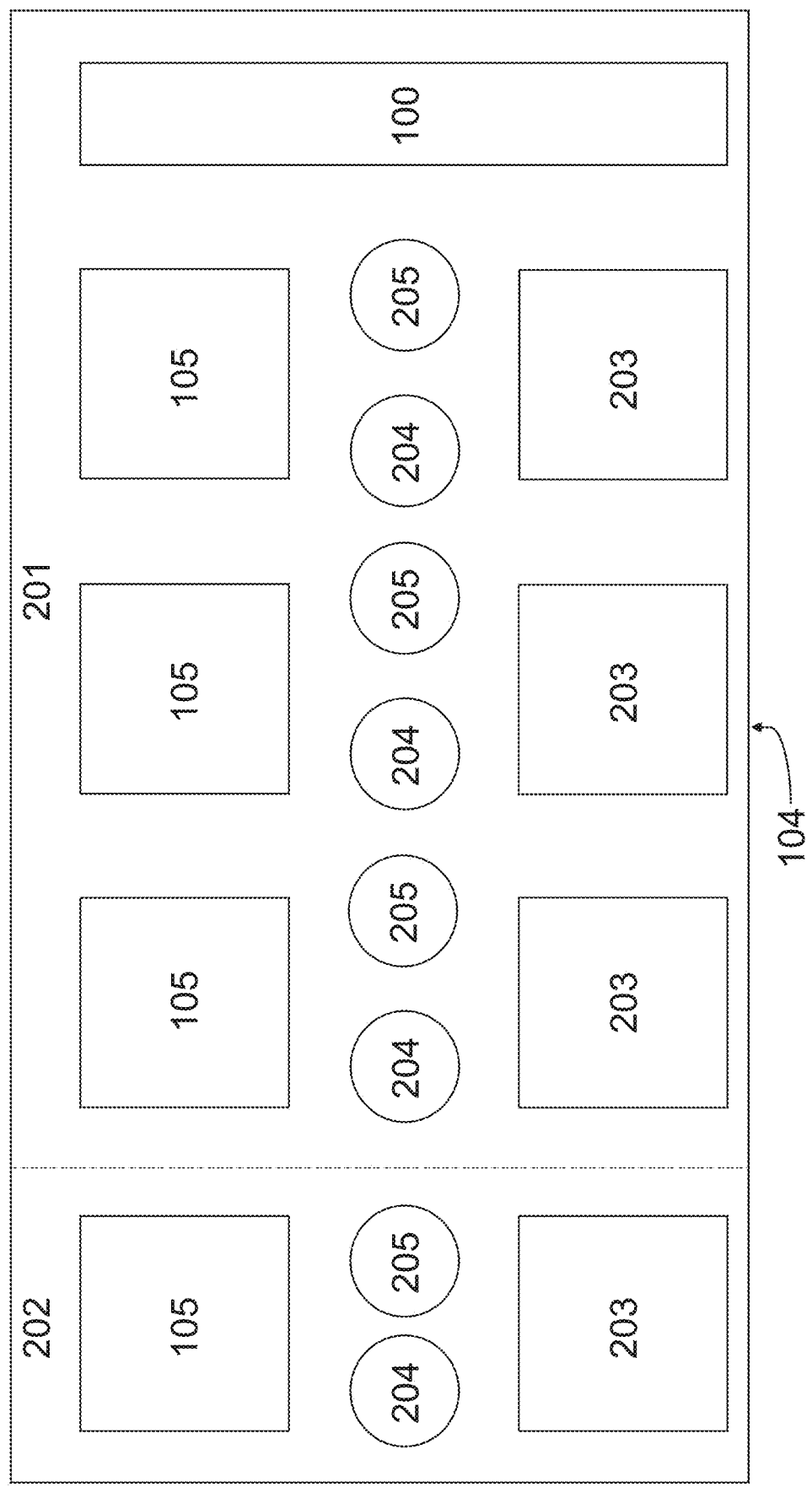
FIG. 2 shows an example of a venue.

FIG. 2 depicts an example of a venue 104. Venue 104 may have an indoor area 201 and an outdoor area 202. Venue 104 may have a plurality of consumable events 105 and a plurality of events or activities that do not require queueing for 203. Venue 104 may house system 100 from FIG. 1, or system 100 may be stored remotely from the venue 104. In addition to depicting agents 204 throughout the venue, FIG. 2 shows that people not queued for any event or activity 205 may also be in attendance at the venue 104.

When a person not queued for any event 205 indicates that they would like to attend or consume a consumable event 105 by joining a virtual queue for the consumable event 105 while either at a venue 104 hosting the consumable event 105 or at somewhere external to the venue 104, the queue manager 102 begins to dynamically determine a time to summon the agent 204 to achieve improved throughput of agents 204 and utilisation of the consumable event 105 while decreasing agent time loss when accessing the consumable event 105.

The queue manager 102 may process the progression of an agent through the virtual queue and a consumable event 105 by assigning agents various states depending on their advancement through the process. System 100 stores these agent states into agent database 101b so that queue manager 102 can accurately update the virtual queue as stored in the queue database 101a. Before joining the virtual queue for a consumable event 105, an agent is in an "unqueued" state, which is stored in agent database 101b. When the queue manager 102 adds an agent to the virtual queue for the consumable event 105, the agent enters into a "in virtual queue" state and updates the current state of the agent from the previous "unqueued" state in agent database 101b.

While waiting in the virtual queue for a summon to the consumable event 105, the agent updates to a "summon pending" state, replacing the previous "in virtual queue" state the agent was in within agent database 101b. An agent may update from the "in virtual queue" state to the "summon pending" state, for example, when the agent's Agent Score is first calculated. Once the agent receives a summon to the physical queue, the queue manager 102 updates the agent's status in agent database 101b to a "summoned" state. If the agent decides to postpone their attendance to the consumable event 105 after being summoned, the agent instead updates to a "postponed" state from the "summon pending" state in agent database 101b.

If the agent accepts the summons, makes their way to and is tracked as being within the physical queue of the consumable event 105 or within the physical boundaries of consumable event 105, the agent updates to a "served" state from the "summoned" state in agent database 101b. Once the agent finishes consuming the consumable event 105 and exits the consumable event 105, the agent updates to a "completed" state from the "served" state in agent database 101b and then subsequently enters an "unqueued" state again. In some embodiments, agents may be manually recorded by consumable event staff through devices 106 as entering, commencing consumption, or completing consumption of the consumable event 105. In some embodiments, agents may also be uniquely identified and recorded as entering, commencing consumption, or completing consumption of the consumable event 105 through computer vision, agent interactions with their mobile device 103 or devices at a known location 103, or other methods. If the agent responds to the summons by cancelling their attendance of the consumable event 105, the agent updates to a "user cancelled" state from the "summon pending" state in agent database 101b and then subsequently enters an "unqueued" state again. If the agent either does not respond to a summon or accepts a summon but subsequently does not arrive at the physical queue after a period of time, the agent updates to a "queue cancelled" state from the "summon pending" state in agent database 101b and either returns to a "summon pending" state at the appropriate place in the virtual queue once they become active again or an "expired" state if the agent takes too long to become active on their mobile device 103 again.

If the agent becomes inactive on their mobile device 103 for an extended length of time at any time or state their intent to leave the virtual queue, the agent updates to a "queue cancelled" state from whatever state they were previously in within agent database 101b and then subsequently enters an "unqueued" state again.

In embodiments of the present invention, the system 100, through the queue manager 102 calculates Agent Scores of agents in the virtual queue to reflect the likelihood of an agent arriving at the physical queue of the consumable event 105 within a desired time frame, e.g., within a time window to then utilise an opening in the consumable event, the next 2 to 5 minutes, or any appropriate time window. Agent Scores may also reflect an agent's capacity to attend a consumable event, e.g., whether it is possible for an agent to attend a consumable event at all. In one example, the Agent Score is a number between 1 and 0, where an Agent Score closer to 1 indicates that there is a greater likelihood of the agent arriving at the physical queue within a target time frame and an Agent Score closer to 0 indicates that there is a lower likelihood of the agent arriving at the physical queue within the target time frame. In some embodiments, an agent's Agent Score is calculated by the queue manager 102 as soon as an agent joins the virtual queue and is updated on an ongoing basis until the agent joins the physical queue. For example, an agent's Agent Score may be calculated or updated at a set interval of time, whenever a summon to a physical queue becomes available based on the agent's Agent Score the last time the Agent Score was updated, the agent's current location or a change in the agent's location, and any other relevant factor, or at any other point in time that is appropriate. An agent's Agent Score may also be updated at different frequencies depending on an agent's location, such as an agent's Agent Score updating at a different frequency than an agent's Agent Score that is proximate to the consumable event 105. An agent's Agent Score may be calculated based on one or more system 100 monitored factors that include but are not limited to: an agent's activity on their device, an agent's location or position, an agent's average transit speed, an agent's method of transit, travel-relevant information external to the consumable event, whether the agent is consuming another event, and an agent's preferences. In some examples, the queue manager 102 may use different combinations of the different factors considered when calculating an agent's Agent Score.

As indicated above, an agent's Agent Score may update based on the agent's activity on their mobile device 103. For example, if an agent has not seen the notification sent by the queue manager 102 summoning the agent to the physical queue, e.g., due to being inactive on their mobile device 103, their Agent Score may decrease. In this case, the queue manager 102 will be able to detect, through the queueing application or another application running on the agent's mobile device 103, or through any other element of system 100, that the queueing summons has not been accessed, acknowledged, or otherwise viewed. If the agent indicates that they accept the summon via an application running on their mobile device 103 into the physical queue of the consumable event 105, their Agent Score may increase. Agents are typically given a generous amount of time to arrive at the physical queue, e.g., 30 minutes, after they have accepted the summon. If an agent interacts with their mobile device 103 regularly such that the mobile device 103 is not asleep for prolonged periods of time or they respond to the summons via a kiosk or other device 103, their Agent Score may increase as the queue manager 102 will know that the agent is actively checking their mobile device 103 or other methods to determine their position in the queue due to receiving data from different applications running on the mobile device 103 and will likely see and respond to notifications they receive from the queue manager 102. The queue manager 102 may also detect other agent mobile device activity, such as the agent expressing an intent to consume another event by joining the virtual queue for another consumable event through the queueing application or if the agent orders food or drinks via a mobile device application. The queue manager 102 may also receive data regarding an agent's mobile device battery level via a power management application running on the mobile device 103 and may recommend an appropriate course of action to the agent based on the agent's place in the virtual queue and Agent Score. In one example, the queue manager 102 may issue an early notification with a current estimate of when the agent should seek to arrive at the consumable event if the battery level falls below a defined level. Further, queue manager 102 may inhibit any changes to the agent's state and alter how the agent's Agent Score is recalculated to account for the likelihood that the user's device has run out of battery.

An agent's Agent Score may update based on the agent's location, position, or proximity to a consumable event 105. For example, if an agent is within a certain short physical distance from the entrance of a consumable event 105, their Agent Score may increase; conversely, if an agent is physically far from the entrance of a consumable event 105, their Agent Score may decrease. An agent's location may be determined in a technologically agnostic manner, but methods of determining an agent's location may include the agent's mobile device 103 being detected by one or more of: location beacons 108 within a venue 104, Wi-Fi triangulation, GPS, near-field communication, sequencing estimation, proprietary location tracking services, dead reckoning estimation, the agent interacting with entities or devices at known locations, computer vision, or other wireless communication methods.

In an embodiment, if the queue manager 102 detects that the agent and their mobile device 103 are on the move due to receiving changing or updating location data from the mobile device 103 or a location beacon 108, the queue manager 102 may factor that movement and transit speed into updating the agent's Agent Score or the amount of time prior to an expected consumable event opening that a summons would be sent to that agent. For example, if an agent is moving towards the entrance of a consumable event 105, the agent's Agent Score may increase. If an agent is moving towards the entrance of a consumable event 105 quickly, the agent's Agent Score may increase comparatively more than the increase in Agent Score of an agent that is moving slowly towards the entrance of a consumable event 105. Conversely, if an agent is moving away from the entrance of a consumable event 105, the agent's Agent Score may decrease. If an agent is moving away from the entrance of a consumable event 105 quickly, the agent's Agent Score may decrease comparatively more than decrease in Agent Score of an agent that is moving slowly away from the entrance of a consumable event 105. In some embodiments, an agent's Agent Score may not be altered by the amount of time prior to the target window for event attendance by the agent given their position in the virtual queue at which a summons is sent may be increased or decreased given their relative position and average rate of movement.

An agent's Agent Score or the amount of time prior to a target window for consumption of the event may update based on the agent's method of transit. An agent's method of transit may be how an agent arrives at the physical queue of a consumable event 105 after indicating their desire to consume the event. In some examples, the queue manager may receive data from the venue 104 defining the physical layout and/or architectural floor plan of venue 104 (or have that data stored in memory 101) or may use agent movement or location data stored in the agent database 101b 101c in order to identify whether an agent is taking the stairs, elevator, or other transit method to get to the consumable event 105 they were summoned for. For example, a location beacon 108 placed near a flight of stairs or an elevator may send the system 100 agent location or movement data as the agent makes their way up or down the stairs or elevator.

The queue manager 102 may also take the density of people who are not queued for an event or activity in a venue 104 and consumable event 105 into account when considering an agent's position, rate of movement, and method of transit within a venue 104. The system 100 may receive data from venue 104 or mobile devices of unqueued people to detect the presence and density of people who are not queued for any event or activity, for example, through one or more of the follow methods: venue entry headcounts, ticket sales, bookings, presence or location data from the mobile devices of the people when the people run relevant applications on their mobile devices, detecting mobile phones connected to the Wi-Fi of the venue 104, computer vision analysis of security cameras to identify unique individuals in a space, IR analysis, and individual tokens. By tracking agents and people who are not queued for any event or activity transit behaviour and drawing upon historical transit behaviour data of agents and people not queued for a consumable event, the system 100 factors such data into calculations regarding event consumption, volume of likely requests to join a virtual queue in a period of time, the amount of time before a target window for consumption of a consumable event 105 that a summons should be sent to any particular agent, or the estimated agent arrival times to the consumable event 105. For any number of consumable event 105 types, the rate of consumption or speed with which agents consume an event may change depending on if it is crowded or not.

Additionally, if an agent joins the virtual queue for a consumable event 105 from a location exterior to the venue 104 of a consumable event 105, e.g., from the agent's home, the queue manager 102 may factor the agent's method of transit to the venue 104 and consumable event 105 into updating the agent's Agent Score. Depending on if the agent decides to take a bike, car, public transport, or some other mode of transportation to the consumable event 105, the queue manager 102 may update the agent's Agent Score accordingly. As discussed above, the queue manager 102 may take into account the transit speed of an agent when updating the agent's Agent Score, thus the transit speed, whether considering the average transit speed or a dynamically updated transit speed, may be considered by the queue manager 102 irrespective of if it has detected the agent's method of transit, e.g., from receiving data from a public transport data source or by comparing agent transit speeds against average transit speeds for different vehicles or methods of transport. For example, as riding a bicycle would typically take longer to reach a location than driving a car, assuming a common starting place and similar travel conditions, the queue manager 102 may increase the Agent Score of an agent driving a car to a consumable event 105 comparatively more than the increase in Agent Score of an agent riding a bicycle to the consumable event 105, subject to external influences.

Although the bicycle/car example above assumes that the agents have similar travel conditions, the queue manager 102 may also take into account different travel-relevant factors or externally influencing data external to a consumable event 105, which may be stored in external influence database 109 and accessed by the queue manager 102, when calculating an agent's Agent Score or expected travel time to the consumable event. For example, the system 100 may receive data regarding adverse weather or traffic conditions, or public transport conditions from a variety of external influence sources 109 that would affect an agent's trip from a starting location to the consumable event 105. On top of rainstorms or traffic jams slowing down an agent's transit from a starting location to the consumable event 105, the queue manager 102 may track the progress of the rainstorm or traffic to update the agent's Agent Score accordingly. Additionally, should an agent encounter adverse weather or traffic conditions while en route to the consumable event 105, the queue manager 102 may factor such delays into the agent's Agent Score and the agent's estimated time of arrival to the consumable event 105. The queue manager 102 factors how long it takes an agent to arrive at the physical queue while considering travel-relevant or externally influencing data in order to determine when to summon the agent to the physical queue, subject to when an opening in the physical queue becomes available. In scenarios where an agent is experiencing a combination of travel-relevant externally influencing effects external to a consumable event 105 that has historically resulted in agents cancelling their event attendance, such as a snowstorm combined with a traffic accident on the road the agent is travelling on, the queue manager 102 may seek reaffirmation from the agent as to their desire to attend the event 105 if summoned. The queue manager 102 may lower the agent's Agent Score until the agent reaffirms their intention to attend.

The queue manager 102 may also use adverse weather information to adjust affected agents' Agent Scores when there are outdoor venue 202 consumable events 105. For example, if a rainstorm hits while an agent is in a virtual queue for the outdoor consumable event 105, the queue manager 102 will take agent delays getting to the consumable event 105 caused by the rainstorm into consideration. Additionally, in the event of a rainstorm, if a venue has outdoor consumable events 105, the queue manager 102 would factor the potential increase in indoor venue traffic when calculating Agent Scores as agents and other people who are not queued for any event or activity may be inclined to head or stay indoors.

An agent's Agent Score may update based on agents inferred or explicit intent such as whether the agent is consuming another event or engaging with an event that does not requiring queueing for. For example, if the queue manager 102 detects that an agent is in a restaurant and has ordered food or drinks, for example by receiving data from an ordering computer at a restaurant consumable event 105 that the agent has ordered food or drinks from that restaurant's menu, or by inferring this from data from the venue 104 showing that a restaurant is located at the location where the agent is not moving, or by some other detection means, the system 100 may lower the agent's Agent Score for the duration of the agent's meal. The time it takes an agent to finish their meal may be inferred by the agent remaining stationary at a location reserved for the consumption of food or through the average time taken to consume a meal in a particular food service facility and the timestamp associated with the agent's food order being transferred from the kitchen to the agent by a server as recorded by the food service system. Also, if an agent has joined two virtual queues belonging to two different consumable events 105 and the agent has joined the physical queue of the first consumable event 105, the agent's Agent Score of the second consumable event 105 may decrease for at least the duration of time the agent is consuming the first event 105. In this way, the system 100 ensures that multiple virtual queues for consumable events 105 may coexist harmoniously and that agents are not summoned to any event 105 they cannot attend because of the progress of a virtual queue for a different consumable event 105.

An agent's Agent Score may update based on the agent's preferences, inferred preferences, or inferred behavioural classifications. If an agent remains in a certain location or area of a venue for a period of time longer than the average time an agent (or a person who is not queued for any event or activity) spends or longer than a determined threshold of time at that location or area or at a series of locations, areas, or galleries, the queue manager 102 will use this agent location data or movement data indicative of slow or fast movement and learn that agent's preference for that location, characteristics of such locations, or areas and factor that into the agent's Agent Score. For example, if an agent has remained in a café or in a particular gallery of a museum for a period of time that is longer than the average time an agent (or a person who is not queued for any event or activity) spends at that location or area, the queue manager 102 may decrease the Agent Score of the agent but also learn that the agent has a preference for that location or area. In examples where the queue manager 102 has access to the physical layout and architectural floor plan data of a venue 104, the queue manager 102 may treat different spaces differently, such as expecting agents to stay in a café space for a different period of time than in a gallery space depending on whether the agent has a preference for cafés or particular galleries, or realising that an agent is in a restroom space and may not necessarily have a preference per se for being in the restroom.

As the queue manager 102 is able to track the movements of an agent, the queue manager 102 may identify whether an agent moves quickly or slowly inside of a venue 104 either relative to their own average pace of movement or the movement of other agents. In some examples, queue manager 102 learns that "fast" or "slow" agent movements may be indicative of agent's preferences. For example, an agent moving slowly through a particular gallery of a museum may indicate the agent's preference for the contents or layout of the gallery, especially when compared to another agent who moves quickly through the same gallery.

The queue manager 102 may also learn an agent's preferences by seeing what the agent has scheduled for the day. For example, an agent might have a ferry ride at 10:00 AM, a guided tour at 11:00 AM, a lunch reservation at 12:30 PM, a talk at 2:30 PM, and a dinner reservation at 5:30 PM. The queue manager 102 might be able to determine that the agent has a preference for guided tours, talks, and eating at restaurants and factor this information into the agent's Agent Score and may recommend related guided tours, talks, and restaurants to the agent. In some situations, the system 100 may also guide agents to consumable events 105 or events or activities that do not require queueing for within the same venue by providing agents with directions on how to reach the recommended event via the queueing application running on the agent's mobile device 103. The queue manager 102 may also treat information about an agent's preferences differently if the agent is moving "fast" or "slow" mover and the agent has a limited amount of time before an event, e.g., a ticketed event. For example, a "slow" moving agent may have different preferences and behaviours if they only have one hour before a ticketed event.

The queue manager 102 may also learn an agent's preferences through the agent's actions. For example, if the agent indicates that they "like" or "dislike" a piece of artwork in a museum or if the agent rates a piece of artwork in a museum a certain level amongst a range of values via a mobile device application 103 transmitting data to the system 100, the queue manager 102 may learn that the agent has a preference for certain pieces of art and may factor that into the agent's Agent Score. The queue manager 102 may then know that if the agent passes by artwork similar to the piece of artwork that the agent has "liked" or rated highly, the agent may spend more time there and their Agent Score may decrease accordingly, for example based on historical data gathered for other agents that establishes a correlation between the art works. The queue manager 102 may also determine an early time to summon the agent to allow the agent more time to reach the entrance of the consumable event 105 if the path from the agent's current location to the entrance of the consumable event 105 has artwork that the agent has "liked" or rated highly along the way. Additionally, the system 100 may also suggest or recommend to the agent other pieces of artwork in the same venue or in different venues that are similar to the piece of artwork that the agent has "liked" or rated highly.

When the queue manager 102 is aware of an agent's preferences, the queue manager 102 may take these preferences into consideration when calculating how long the agent will take to consume a consumable event 105 when deciding when to summon subsequent agents to the physical queue of the consumable event 105. For example, if an agent has a preference for taking the time to read everything in an art exhibit or listen to everything at an exhibit, e.g., playing an interactive recording installed accompanying a piece of art or a segment in an audio guided tour, the queue manager 102 may factor this into the agent's Agent Score and the amount of time an agent might take in consuming a consumable event 105. Instead of or in addition to learning an agent's preferences, the queue manager may directly ask agents what their preferences are, for example by presenting the user with a series of questions when they configure the application on their device or when they arrive at a venue and then update their Agent Score accordingly and factor that information into its decisions regarding summoning the agent. System 100 may also monitor actual agent consumption times of the event to dynamically update its calculations regarding likely time by the agent consuming the event and enhance its ability to predict the amount of time other agents will spend consuming an event given their behaviour and preference data. The system 100 may store agent preference data and any data related to preference data such as agent location or movement data in agent database 101b such that queue manager 102 may access the data at any time and factor it into Agent Score calculations or machine learning operations.

In embodiments of the present invention, agents in the virtual queue with a low Agent Score are not removed from the virtual queue. Instead, the queue manager 102 will skip them and offer physical queue slots for event consumption to active agents, i.e., agents with a high Agent Score, until the agents in the virtual queue with low Agent Scores become active and raise their Agent Score. Hence, the lower an agent's Agent Score is, the less of an impact the agent's presence or lack thereof will have on the overall time estimates for agents that have joined the virtual queue after the agent with the low Agent Score.

When an inactive device awakens, the associated agent's Agent Score is re-evaluated and re-established and the agent is reinstated at an appropriate position in the virtual queue. As other agents further ahead in the virtual queue may have been served in the time the agent with the inactive device stayed inactive, the agent may often find themselves with a shorter estimated wait time in the virtual queue than before they became inactive on their mobile device 103 once they become active on their mobile device 103 again. As an agent's history of desire to attend the event, stored both in agent database 101b and history database 101c, is a factor being utilised by the system 100, the agent may often regain their queue position and the timing of being invited to attend is virtually unaffected by their device becoming inactive for a period of time. For example, if an agent is inactive on their mobile device for 2 hours but the estimated wait time for a virtual queue is 1 hour long, the agent may find themselves at the front of the virtual queue with a summons to the consumable event once they re-open the queueing application on their mobile device 103. In some cases, an agent's entry into the virtual queue may expire only after the agent has been inactive on their mobile device 103 for an extended length of time.

In embodiments of the present invention, when an agent's Agent Score is low, but the agent is proximate to the physical queue, the queue manager 102 may send a notification through the queueing application running on the agent's mobile device 103 in order to summon the proximate agent to the consumable event, for example, in order to fill any gaps that have suddenly arisen in the physical queue, to thereby increase agent throughput through the consumable event 105. This essentially allows the proximate agent to jump the queue in a circumstance where a gap would have arisen if the agent with the highest Agent Score was summoned.

In addition to agents indicating that they accept the summons to the consumable event 105, agents may also postpone or cancel attending the consumable event 105. If the agent indicates that they wish to postpone their entry into the physical queue, the agent may retain their position at the front of the virtual queue but will be skipped for a period of time, e.g., 10-15 minutes, after which they will be summoned to the consumable event 105 once again. In one example, agents may postpone attending the consumable event 105 when summoned to the consumable event 105 a configured number of times until they are removed from the virtual queue altogether and must re-join the virtual queue again. If the agent indicates that they wish to cancel attending the consumable event 105, they may be removed from the virtual queue for that consumable event 105. Additionally, if an agent sees the notification summoning the agent to the consumable event 105 but does not respond to the notification, the summon may expire after a predetermined amount of time, e.g., 30 minutes, where the agent would have to join the virtual queue for the consumable event 105 again should they desire to consume the event 105.

To better visualise the dynamic queueing ability of the system 100, FIG. 3 presents an example of a dynamic queue model 300. Virtual queue 301, physical queue 302, and consumable event 303 each have a number of specific agents within their space, where the queues begin on the right and are filled out to the left. Agent 304 represents an individual agent that is being served or is currently consuming the consumable event 105. Agents 305 represent two agents that have responded to their summons to the consumable event 105 and are currently in the physical queue 302 at the entrance of the consumable event 105, shortly awaiting their entry into the consumable event 105. At the front of the virtual queue 301 is an agent 306 with an Agent Score of 0.1 due in part to having a mobile device asleep 103 for more than 30 minutes. Next, agents 307 each have an Agent Score of 0.1 due in part to each agent currently attending a different consumable event 105. Next, agents 308 each have an Agent Score of 0.1 due in part to each having a mobile device 103 asleep for more than 30 minutes. Next, agent 309 has an Agent Score of 0.5 due in part to having a mobile device 103 asleep for 15 minutes. Next, as a result of agents 306-309 having a low Agent Score, the system 100 skips over agents 306-309 and places agent 310, who is active on their mobile device 103 and is near to the consumable event entrance at the front of the virtual queue 301 so that agent 310 will be the next agent summoned to the physical queue 302.

As agents 311 are also active on their mobile devices 103, the queue manager 102 will summon them after summoning agent 310 if agents 306-309 do not raise their Agent Scores in the meantime. Next, agent 312 has an Agent Score of 0.5 due in part to having a mobile device 103 asleep for 15 minutes. Finally, agents 313 are both active on their mobile devices 103, so assuming agents 306-309 and 312 do not raise their Agent Scores, they should be the next agents to be summoned to the physical queue 302.

Figure 8:
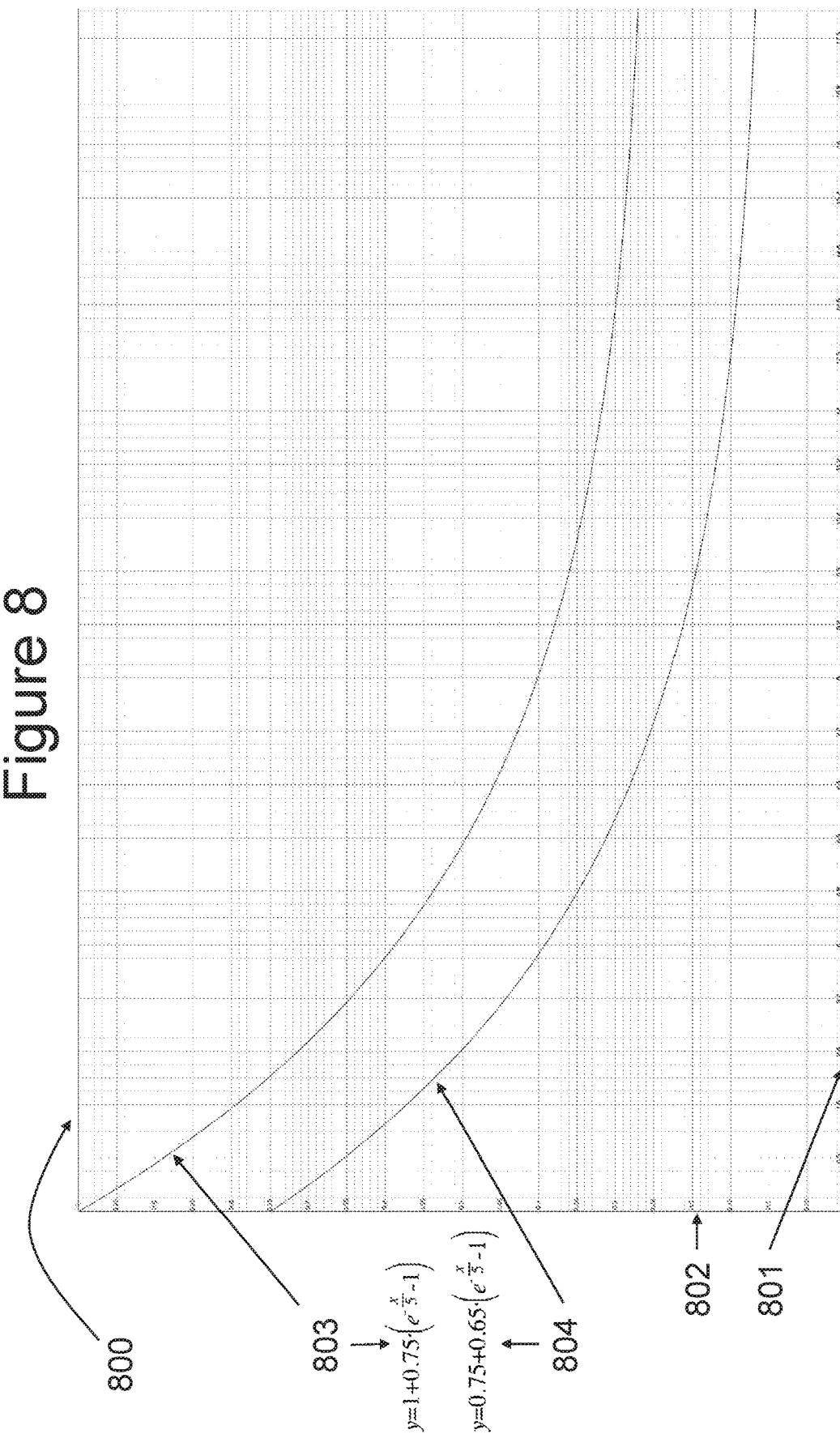
FIG. 8 shows a graph with simplified examples of likelihood of arriving soon functions.

FIG. 8 is a graph 800 depicting examples of simplified likelihood of arriving soon functions, with x-axis 801 representing time in minutes and y-axis 802 representing Agent Score. A first likelihood of arriving soon function and plot 803, $y=1+0.75(e^{-x/5}-1)$, and a second likelihood of arriving soon function and plot 804, $y=0.75+0.65(e^{-x/5}-1)$, are simplified examples of the likelihood of a particular agent or group of agents of arriving at a consumable event 105 within a target time frame that queue manager 102 may calculate and dynamically adjust in order to determine when to summon the agent or group of agents to the consumable event 105. For example, function and plot 804 shows that the higher the agent's or group of agents' Agent Score is, the less time it will take for the agent or agent group to arrive at the consumable event 105. For function 804, when the agent's or group of agents' Agent Score is 0.5, queue manager 102 can operate on the basis of an estimate that the agent or group of agents to arrive at the consumable event 105 in 2.5 minutes. As the agent's or group of agent's Agent Score decreases, the time system 100 can expect the agent or group of agents to arrive at the consumable event 105 increases. Queue manager 102 may determine that in order to efficiently allow agents to arrive at and consume the consumable event 105, a number of agents with Agent Scores close to 1 may be summoned to the consumable event 105, as the agents are likely to arrive at the consumable event 105 within a short amount of time, before an agent with a lower Agent Score with a position closer to the front of the virtual queue. Further, queue manager can derive times at which to summon agents from the likelihood to arrive graph. As discussed above, an agent's Agent Score is dependent on and influenced by a variety of different factors that the system 100 tracks in real time such that queue manager 102 can dynamically update and decide when to summon the agent.

In embodiments of the present invention, in addition to, or as an alternative to using one or more Agent Scores to determine the capacity and likelihood of an agent arriving at a physical queue of a consumable event 105 within a target time frame, the queue manager 102 may utilise machine learning or artificial intelligence to decide when to summon an agent to the consumable event 105. The system 100 may utilise machine learning to analyse agent behaviour data and recognize patterns regarding agent behaviour. For example, through utilising machine learning, the queue manager 102 may process agent behaviour data obtained through various applications running on agent mobile devices 103 to learn patterns of anticipated agent behaviour by analysing characteristics including transit time, dwell time, individual or group mentality, and likelihood of deviation in order to determine what factors likely to result in the agent arriving at the physical queue at an appropriate time and then process data related to those factors to determine an estimate when the agents are likely to arrive at the physical queue if summoned and to summon agents when that estimate corresponds to a target arrival time for the agents. Additionally, machine learning may help the queue manager 102 adapt estimation and accuracy of information to the agent by matching live agent behaviour data with historical patterns in a way that enables the queue manager 102 to increase in predictive accuracy over time. Machine learning and artificial intelligence may also be utilised to assess or analyse agent consumption behaviour and better predict consumption behaviour so as to better determine when vacancies in consumable events will next become available.

The system 100 may gather data from one or more agents, venues 104, consumable events 105, consumable event staff devices 106, agents of the second class of agents 107, location beacons 108, or external influence sources 109, such as public transit systems or meteorology systems, to provide insight into how an agent would behave given competing attractions or schedules, weather information, occupancy and capacity of transit areas, and the like. To this end, machine learning is especially effective at analysing very large data sets containing many diverse types of data from different sources and identifying patterns and correlations or likely casual relationships that might elude human observation. For example, the queue manager 102 may learn to recognise when an agent would likely deviate from expected behaviour and instead might be ready for lunch, or a trip to the restroom, or be drawn to a cinema or other attraction. The queue manager 102 may also learn that when agents go to some spaces or amenities in a venue 104, such as the restroom, a café, or food court area, agents may have an increased likelihood of departing from the venue 104 taking into account other factors such as time of day. For example, agents may typically leave a venue 104 after eating dinner at a restaurant or watching a movie at night time. By detecting these patterns through agent behaviour data and applying machine learning to produce a data set of predicted agent behaviour, the queue manager 102 is able to adapt to different situations and lead the operations of the system 100 to improve throughput of agents to a consumable event 105, utilisation of the consumable event 105, agent experience within the consumable event 105 and venue 104, and decrease agent time loss when accessing the consumable event 105.

In some embodiments of the present invention, the queue manager 102 receives physical space capacity limit data, the average time data indicating how long it has taken agents to consume the activity or event 105, a calculated estimated completion time for agents consuming the event 105, and actual dynamic time data of current agents attending the consumable event 105 from the consumable event 105, e.g., sensors, terminals, kiosks, or other local data sources of the consumable event 105, or venue 104. As agents currently attending or consuming a consumable event 105 make their way through the event and ultimately exit the event, the queue manager 102 tracks this agent flow rate data by calculating agent location and movement data received by the system 100 from the agent mobile devices 103 over the physical space data of the consumable event 105. Queue manager 102 may utilise this agent flow rate data and physical space capacity limit data, average agent consumption time data, estimated agent consumption completion time data, and dynamic agent consumption time data to calculate a further Agent Score for the agent which is used as an input for summoning further agents to the virtual queue for the consumable event 105. In one example, such an Agent Score indicates the likelihood that the agent will finish consuming the event within a target time (e.g., 5 minutes) which is then used in the determination of when to summon the next agent or agents in the virtual queue to the consumable event 105. For example, when agents are making their way through the consumable event 105 particularly quickly or slowly, the queue manager 102 will adjust the timing of when to summon the next agent or agents. As the system 100 may receive data defining the size of the physical queue from a computer or a staff device at the consumable event 105, the queue manager 102 may revise the queue by summoning additional agents if agents move through the physical queue (and consumable event) faster than anticipated or ramping down the summoning of agents when the physical queue becomes larger than ideal.

In scenarios where a large group of people relative to the capacity of a consumable event 105, e.g., a group of seven agents consuming a consumable event 105 with a capacity of eight agents, suddenly leave or depart from a consumable event 105 unexpectedly early, the queue manager 102 may compensate for the sudden lack of agents consuming the event 105 in a number of ways. The queue manager 102 may allow everyone in the physical queue, such as those agents who have been summoned and who are immediately physically proximate to the consumable event 105, to enter the consumable event 105 while also summoning other agents who are close to the front of the virtual queue to join the physical queue. The queue manager 102 may also summon agents, who are not necessarily at or near the front of the virtual queue, but who are close in physical proximity to the physical queue and the consumable event to join the physical queue or to directly move into the consumable event 105. The queue manager 102 may recalculate Agent Scores, expected transit times, and adjust summon times based on these and other influences at the time. The queue manager 102 may also take advantage of the situation and summon an agent of a second class of agents, such as a cleaner or cleaning robots, to the consumable event 105. For example, by sending an instruction to the cleaning robots to clean the event space before the arrival of the next agents. Although a cleaning robot may already be assigned to thoroughly clean somewhere else within the venue 104, the cleaning robot may be summoned by the queue manager 102 to perform a quick clean of the consumable event space and potentially return later to finish the cleaning job with a modified cleaning job.

In some embodiments of the present invention, a venue or consumable event staff may manually authorize one or more people not queued for a consumable event to become agents and place them directly into the physical queue or consumable event 105. Through a mobile device of their own or other electronic terminal 106, consumable event staff may manually notify the system 100 that a new agent, such as a VIP, has been admitted directly into the consumable event so that the queue manager 102 can take the new agent's consumption of the event 105 into consideration. Also, in some example the consumable event staff may view the virtual queue and expected arrival times of agents through their mobile device 106, consumable event staff may use their discretion to manually admit a person to the consumable event in appropriate circumstances.

Additionally, in a scenario where an agent who may not necessarily be at or near the front of a virtual queue for a consumable event 105 passes by a physical queue for the consumable event 105 and notices that no one is in the physical queue, consumable event staff may agree to usher the agent into the consumable event 105 if doing so would have little to no observable effect or would have a positive effect on agent flow rate through the event 105 or any agents that have been summoned to the physical queue but have been delayed on their way to the event. This scenario may occur when the queue manager 102 updates expected arrival time of a summoned agent on the basis of the receipt of movement or location data indicative of the summoned agent having been unexpectedly slowed or stopped on their way to the physical queue by, for example, because they have been distracted by an exhibit, or location data indicates that they have entered a restroom.

Consumable event staff may also enter data to enable the system 100 to respond to other unforeseen circumstances relating to the consumable event 105, such as event malfunctions, closures, and emergencies. In response to these notifications, the system 100 may issue notifications to all agents in the virtual queue, update agents appropriately on a timeline for the consumable event 105 coming back online, and resume operation once the consumable event 105 is back up or nearly back up and running.

In some embodiments of the present invention, the queue manager continues to operate robustly and resiliently when the system 100 cannot communicate with an agent's mobile device 103 for a period of time. For example, if an agent's mobile device 103 runs out of battery, moves into a communications black-spot, exits the queueing application, or otherwise roams on and off communication networks, the queue manager may temporarily ignore the agent's queue entry, but not necessarily remove the agent from the virtual queue, and skip over the agent in the virtual queue to summon additional agents to compensate. Once the agent's mobile device 103 re-establishes communication with the system 100, the system 100 may update the agent's position in the virtual queue based on who has been served in the meantime and continue dynamically determining when the agent may be summoned to the physical queue of the consumable event 105. Additionally, because the system 100 may receive and access physical layout of a venue and historical agent data from venue 104, the system 100 may continue to dynamically determine when the agent may be summoned to the physical queue if the agent is moving through a known communications black-spot, such as an elevator. Furthermore, system 100 may utilise devices not held by agents to allow agents to interact with the system. For example, if an agent's mobile device has run out of batteries, the agent may interact with kiosks or other terminals or devices 103 or may ask a venue or consumable event staff to interact with the system 100 via their staff device 106 to receive summons and to communicate with the system 100 their intent to consume or attend the consumable event 105.

In some embodiments of the present invention, the queue manager 102 maintains operating or winds down maintaining the virtual queue in the event of an unexpected or otherwise catastrophic network outage or failure. In either localised or site wide network outages, the queue manager 102 may execute programs and protocols to avoid algorithmic runaway. The states of agents and the representation of agents' states in the system 100 is sometimes fractured or decentralised so that at least some information can be communicated to the agents through their mobile devices 103 in the event of a network failure. For example, the representation of agents' states does not assume that constant and reliable network connectivity is available and communication between the queue manager 102 and agents cannot rely solely on connectivity. If the system anticipates that an agent should be summoned at a certain time, the queueing application will send data representing this future state to the agent's mobile device so it can be maintained locally in cache of the agent's mobile device 103 and the application will generate a notification locally at the agent's mobile device in the event that the system 100 is unreachable. That is the applications running on agents' devices will inform agents of relevant options and outcomes, held locally in the respective agents' mobile device 103 caches, of how to proceed in the queue from that point in time if communication reaches an offline state. Agents may also be provided with instructions and updates at various points in time while the agent is in the virtual queue and communication networks are functioning properly regarding how to proceed should communication break down.

Additionally, the queue manager 102 may continue improved functioning of determining when to summon an agent to a consumable event 105 when network connectivity is lost by continuing to calculate Agent Scores and/or applying machine learning based on last known available agent data, which includes data regarding the agent and data relevant to the agent's position, rate of movement, and other behaviours from any source of data necessary for such calculations, when offline. By continuing to calculate and function as if online, the queue manager 102 may continue to predict what the current state of an agent will be despite the lack of network connectivity. Once the network comes back online and communication between the agent mobile devices 103 and the system 100 is re-established, the queue manager 102, can resume optimal or near optimal performance as quickly as possible thanks to the calculations performed while the network was offline or otherwise unavailable. If network communication is not re-established, the queue manager 102 may still provide likely expected states of agents or agent arrival times when queried, e.g., by receiving a request from a consumable event staff through a consumable event staff device 106.

In some embodiments of the present invention, the queue manager 102 utilises a dynamic slotted queue model to best provide agents with the certainty of a precise starting time to consume a consumable event 105, which may not require or involve the agents pre-purchasing a consumable event ticket for a specific time slot. In a dynamic slotted queue model, the system 100 allots consumable event consuming time slots on a schedule with a consistent interval from the moment a consumable event 105 opens based on venue or consumable event ticket sales. Consumable event consuming time slots are scheduled and opened up on a rolling basis of a configurable period of time, e.g., 15 minutes, from when the event opens and agents are automatically allocated a slot with a fixed starting time. When a person first joins the virtual queue for the consumable event 105 in the queueing application, the person must express how many people are in their group. As entire groups of agents are allocated consuming time slots as a whole, groups cannot be larger than the event's maximum capacity or available space (which is configurable and vary per event). The system 100 may store agent group data in agent database 101b and history database 101c in order to monitor and calculate the Agent Score of the group.

The dynamic slotted queue model is best described by way of non-limiting examples, as shown in FIGS. 4A-4E.

FIG. 4A depicts dynamic slotted queue model 400 with a virtual queue for slotted queues 401, a plurality of agent groups 402, where each number within the plurality of agents (1, 2, 1, 3, 4, 2, 2) represents the number of agents within that group and the front of the queue is the rightmost number (2 in this case), and four consumable event time slots corresponding to different times, 10:00 AM time slot 403, 10:15 AM time slot 404, 10:30 AM time slot 405, and 10:45 time slot 406, where each time slot has a four agent capacity. The queue manager 102 picks agent group entries in the virtual queue one by one and tries to fit them into the earliest slot that has enough space for the number of people in the booking, subject to Agent Score and machine learning criteria discussed above. In the agent group case, the queue manager 102 may calculate the Agent Score of one or more agents in order to determine if the agent group is ready to join the time slot. For example, one agent out of a group of four agents may designate themselves to be the leader; in this case, the queue manager 102 would only calculate the Agent Score of the leader, with the understanding that the entire group would be ready to attend the consumable event 105 if the leader accepts a summon to the consumable event 105.

Figure 4B:
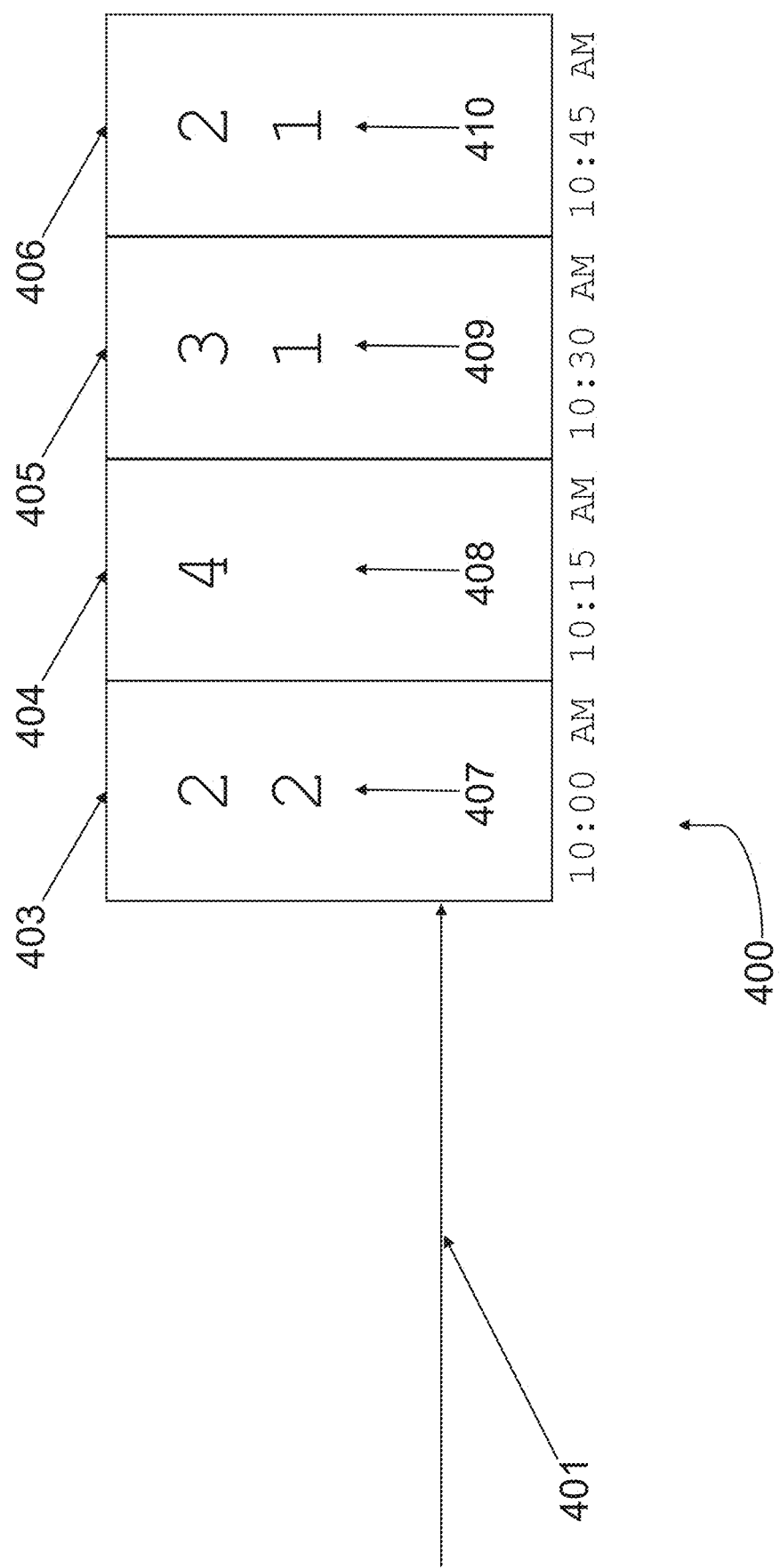
FIG. 4B shows further steps of the example of using the dynamic slotted queue model from FIG. 4A.

Assuming the agent groups have no Agent Score issues or other factors interfering with their ability to attend the consumable event 105, FIG. 4B depicts a scenario where the queue manager 102 takes the first two groups of two agents 407 and allocates them to the 10:00 AM time slot 403. Next, the group of four agents 408 is allocated to the 10:15 AM time slot 404, thus occupying the entire time slot. Next, the next two agent groups in the virtual queue, a group of 3 agents and a single agent 409, are allocated to the 10:30 AM time slot 405. Finally, the last two agent groups in the virtual queue, a group of 2 agents and a single agent 410, are allocated to the 10:45 AM time slot 406.

The queue manager 102 tries to allocate agent group bookings to time slots on a first-come first-serve basis, but there are cases where the queue manager 102 will allocate agent groups who join the queue later to earlier time slots if there is available space. Again, assuming the agent groups have no Agent Score issues or other factors interfering with their ability to attend the consumable event, FIG. 4C shows a plurality of agent groups 412 in the virtual queue 401 with a group of three agents, a group of two agents, and another group of three agents at the first three positions of the virtual queue, each of which cannot be in placed together in any of the time slots, thus they must each be allocated to different time slots.

Figure 4D:
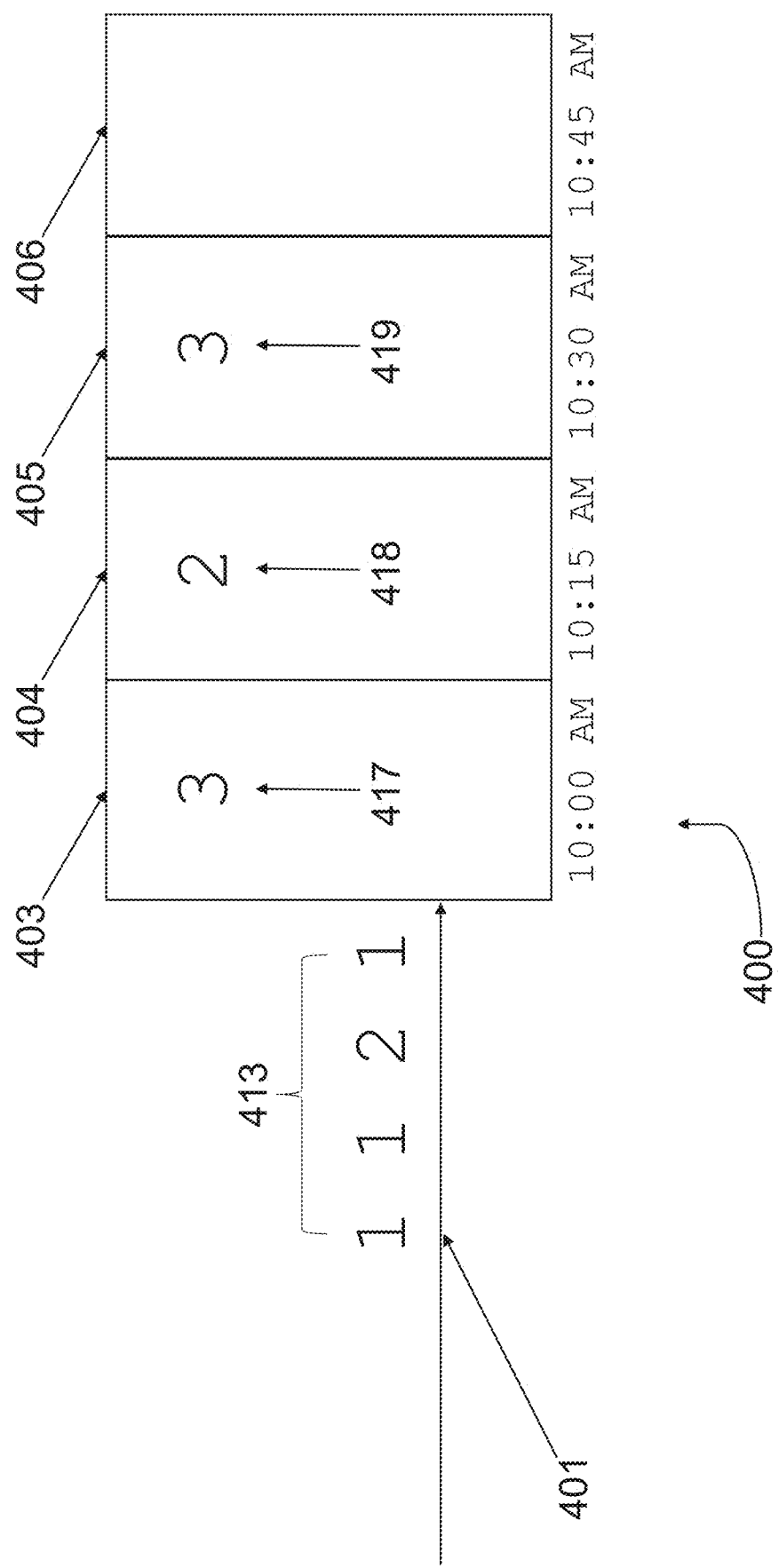
FIG. 4D shows further steps of the example of using the dynamic slotted queue model from FIG. 4C.

In FIG. 4D, the first group of three agents 417 will be allocated the 10:00 AM time slot 403, the group of two agents 418 will be allocated the 10:15 AM time slot 404, and the second group of three agents 419 will be allocated the 10:30 AM time slot 405. From here, the queue manager 102 fills the remaining spaces in time slots 403, 404, and 405 with agent groups 413.

In FIG. 4E, a single agent joins the first group of three agents to become a fully allocated time slot 427 in the 10:00 AM time slot 403, a second group of two agents joins the first group of two agents to become a fully allocated time slot 428 in the 10:15 AM time slot 404, a second single agent joins the second group of three agents to become a fully allocated time slot 429 in the 10:30 AM time slot 405, and the remaining third single agent 430 is allocated to the 10:45 time slot 406. In this case, even though some agent group were assigned to earlier time slots than other agent groups that had joined the virtual queue earlier, the queue manager 102 strives to allocate each agent group to the best possible time slot. In this way, the queue manager 102 fills gaps where possible to allow each time slot to be as full as possible, which both increases the throughput of agents through a consumable event 105 and reduces a consumable event's queue wait time throughout the day.

In the dynamic slotted queue model, the queue manager 102 considers a time slot to be "possible" if, for an agent group, the number of free spaces in the time slot is greater than or equal to the number of agents in the agent group. Thus, the queue manager 102 may first allocate agent groups to time slots if the agent group is flagged with a prepaid ticket status, then allocate agent groups to open, non-cancelled slots by summoning agent groups in a "waiting" state when there are possible open time slots depending on when the agent group joined the virtual queue and the agent group's Agent Score. In scenarios where a consumable event 105 has imminent time slots that have available space for agents, the queue manager 102 may fill the remaining spaces by summoning proximate agents or agent groups to jump the virtual queue and join the physical queue, prioritising agents with a high Agent Score.

In some scenarios, upcoming consumable event time slots can be cancelled if a problem arises with a consumable event 105 that prevents the orderly and improved processing of agents through the queues. When time slots are cancelled, a reshuffling process occurs where existing queue entries are deallocated from their current slots and then reallocated on a best-effort basis. For example, the queue manager 102 may inventory and categorize agent groups in the virtual queue as either "prepaid" or "casual" groups, where prepaid agent group bookings are agent groups that have purchased tickets ahead of time for specific time slots and all other agent group booking are considered casual. The queue manager 102 may then allocate all prepaid agent groups to the earliest possible, non-cancelled time slot that begins on or after the originally purchased ticket's time slot; in this case, all time slots for the rest of the day are considered and not just time slots within the upcoming window. The queue manager 102 may then allocate casual agent groups to upcoming, open, possible, non-cancelled time slots, where agent groups that have previously been assigned earlier time slots are prioritised; any agent groups which cannot be allocated in this step are left in a "waiting" state.

Through the systems and methods described above, the queue manager 102 allows for a high degree of granularity in controlling consumable event operations that increases agent throughput through consumable events, increases consumable event and event space utilisation, decreases consumable event wait times, and decreases the time an agent loses to accessing a consumable event 105. Because of the flexibility of the queue manager 102 dynamically updating the virtual queue, the queue manager 102 allows venues to increase footfall or foot traffic, such as giving agents more opportunities to visit a gift store or café within the venue, which in turn translates into increased sales. For consumable events 105 where tickets must be purchased, the queue manager 102 may also increase ticket sales as a result of the queue manager 102 increasing agent throughput through consumable events 105 and increasing convenience or comfort for agents with regard to their ability to consume events in context of their other activities at a venue or venues or throughout a day. Because the system 100 allows for adjustment of consumable event parameters such as agent flow rate and density, the queue manager 102 may improve an agent's experience of the consumable event 105 and venue 104 by giving the agent excellent conditions with which to experience the consumable event 105 in.

In some embodiments of the present invention, system 100 is able to provide better agent experiences and increase consumable event utilisation where consumable events 105 are widely distributed through a very large space, such as throughout a city. In these cases, consumable events 105 may include one or more of multiple live art, music, and theatrical performances, some of which may have dynamically variable time lengths based in part on audience or agent interaction with the performance. Consumable events 105 and their corresponding venues 104 may reach maximum capacity at any point in time given that there may be highly variable rates of consumption for different types of agents, such as gallery spaces that are moved through at different speeds by different agents but have a fire marshal define occupancy limit or food and beverage services wherein agents may opt to consume quickly or slowly. In each case, the queue manager or queue managers 102 factor each agent's variable consumption of consumable events 105, the dynamic nature of different consumable event 105, various methods of transiting or moving between consumable events 105, the dynamic nature of the transit times as externally influenced by other variables such as weather, traffic, or public transport, the dynamic nature of the distribution of agents who accepted, cancelled, or postponed their summon to a consumable event 105, and any Agent Score or machine learning factor discussed above to decide when and how the system will communicate with or summon agents.

In a non-limiting example, the queue manager 102 may consider a restaurant to be a consumable event 105 defined by tables, bars, counters, or other surfaces to consume food or drink on, with seats or standing space. Unlike some consumable events 105 which may have fixed or fairly predictable consumption times, restaurants generally have fairly variable ranges of consumption times, i.e., the time it takes an agent or group of agents to finish their meal at the restaurant and leave. Queue manager 102 may calculate and learn expected agent and agent group restaurant, or other consumable event, consumption times based on when dishes or courses are served, preparation time for specific dishes ordered, agent group size, venue crowdedness or density, and consumable event staffing levels, in order to determine when agents are likely to finish consuming the consumable event and when agents should be summoned from the virtual queue to the consumable event, e.g., their seats, table, or space at a restaurant. For example, if the restaurant or kitchen is understaffed, food and drinks may take longer to be prepared and served than usual, thus negatively impacting agent consumption throughput in the restaurant and slowing consumption rates. In order to decrease the negative impact on the overall agent experience, system 100 utilises this restaurant or consumable event 105 data to better predict agent consumption times, when to summon agents to the restaurant or consumable event, and other information provided to agents to decrease wait time wasted in physical queues.

Queue manager 102 may also adjust agent summon timing based on the system's location awareness of the agents, agent distance from the restaurant or other consumable event 105, agent expected transit time from their dynamically changing position back toward the restaurant, table, or other consumable event 105, and other factors discussed above relating to Agent Scores and machine learning of agent behaviour. In this way, a restaurant's or other consumable event's queue manager 102 may factor the above variables in order increase agent consumption and utilisation of the restaurant space.

In another non-limiting example, in a venue with limited location awareness functionality, the system 100 may still be utilised to reduce physical queue times and allow agents more free time. For example, if location beacons 108 or consumable event staff with mobile devices 106 in communication with the system 100 are placed at consumable event 105 entrances, the queue manager 102 gains data at a point near the consumable events 105. By having data indicative of when agents are proximate to consumable events 105, the queue manager can assess the statuses of the physical queues of consumable events 105 and summon proximate agents to consumable events 105 when vacancies open up in physical queues due to agent cancellation, postponement, or expiry. Like in a venue with full or widespread location awareness functionality, the queue manager 102 may calculate Agent Scores based on the factors discussed above and summon additional agents or ramp down summoning of agents in appropriate cases when the physical queue reaches an unsatisfactory state.

Figure 5:
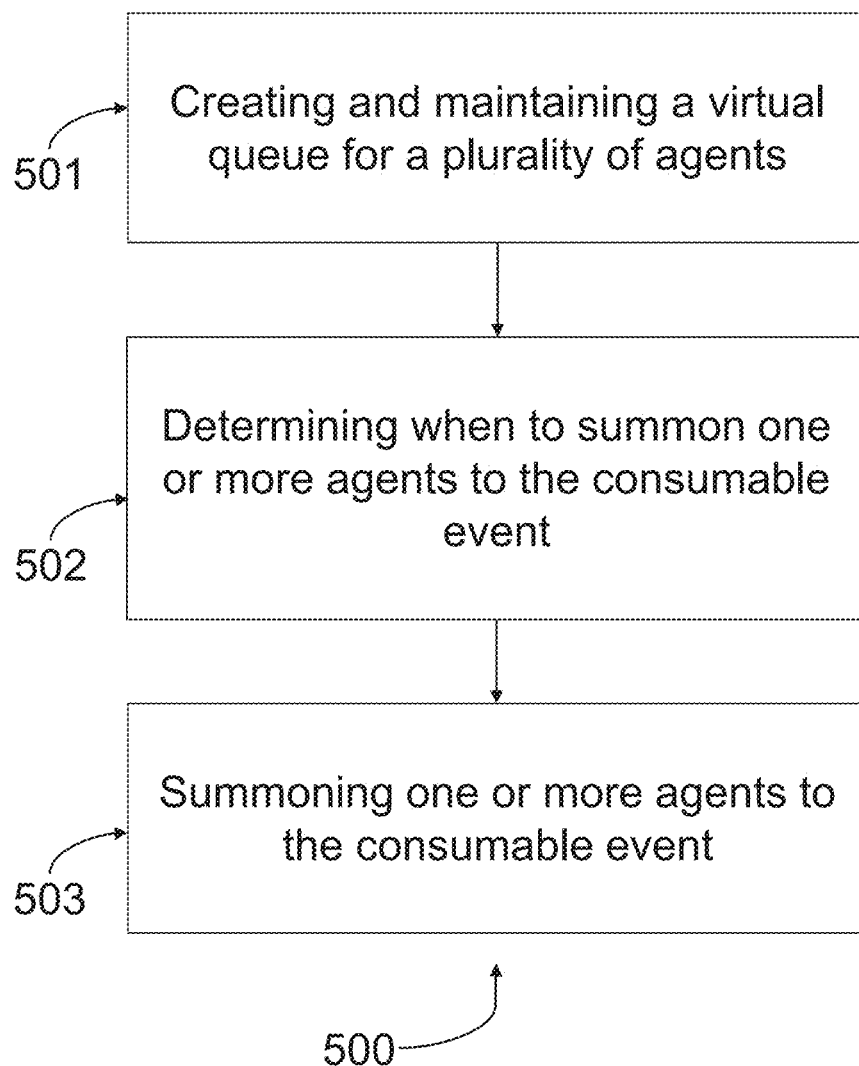
FIG. 5 shows an example of a method according to an embodiment of the present invention.

In FIG. 5, in some embodiments of the present invention, a method for maintaining a virtual queue and summoning agents 500 is provided. At step 501, queue manager 102 creates a virtual queue when an agent's mobile device 103 indicates to the queue manager 102 via the queueing application running on the mobile device 103 that the person wishes to join the virtual queue for a consumable event 105 and maintains the virtual queue by continuing to add agents sequentially to the virtual queue. At step 502, as discussed above, the system 100 determines when to summon one or more agents to the consumable event 105 based on the different ways the queue manager 102 monitors the agents. At step 503, the queue manager 102 summons one or more agents to the consumable event 105.

In some embodiments of the present invention, the queue manager 102 may determine an opportune time to summon agents of a second class of agents to perform actions based on the monitoring of agents of a first class of agents and the monitoring of agents of the second class of agents. In some example, the queue manager 102 may take into account the schedules of one or more consumable events which may be at one or more different venues. Like the first class of agents, monitoring of the second class of agents includes monitoring any factor that goes into calculating the Agent Score of agents of the second class of agents or machine learning the behaviour of agents of the second class of agents. The Agent Score of agents of the second class of agents may be calculated or updated upon detection of a relevant consumable event beginning or ending, such as a golf lesson starting or a theatre letting out that needs to be cleaned before the next show begins.

In a non-limiting example of the queue manager 102 determining an opportune time to summon agents of a second class of agents to perform actions, the system 100 considers a large resort scenario where the large resort may be a venue 104 with one or more consumable events 105 that provides vehicle transits (agents of the second class of agents), e.g. buses or other forms of transportation vehicles, to and from each consumable event 105 and one or more consumable events 105 external to the venue 104. In this case, the Agent Score of a bus (whether self-driving or human operated) would refer to the likelihood of the bus arriving at an agent of the first class of agents pick up location within a period of time. In order to increase the throughput of agents of the first class of agents through the consumable events 105, either in or external to the venue 104, the experience and satisfaction of the agents of the first class of agents, consumable event utilisation, and decreasing or eliminating agent time loss when accessing the consumable event 105, the queue manager 102 may account for a number of vehicle related factors. In this example, the queue manager 102 may treat either a bus driver or the bus as the agent.

For example, the queue manager 102 may dynamically alter the distribution, frequency, rate of movement, and loiter time of a transit vehicle at one or more stops of the transit vehicle, while also potentially adjusting parameters of consumption for consumable events 105, such as decreasing a parasailing time slot from 45 minutes to 30 minutes, based on the rate of consumption of the consumable events, agent group sizes of the first class of agents, vehicle utilisation, the number and nature of agents of the first class of agents that have indicated a desire to consume one or more consumable events, and any other factor that goes into calculating the Agent Score of agents of the first class of agents or machine learning the behaviour of agents of the first class of agents. In a large resort scenario, the queue manager 102 of the large resort venue may communicate with other queue managers 102 of systems 100 for different venues 104 where consumable events 105 external to the large resort venue 104 are hosted in order to increase the throughput of agents of the first class of agents through consumable events 105, agent of the first class of agents satisfaction and experience, consumable event utilisation, and decrease agent time loss when accessing the consumable event 105.

Figure 6:
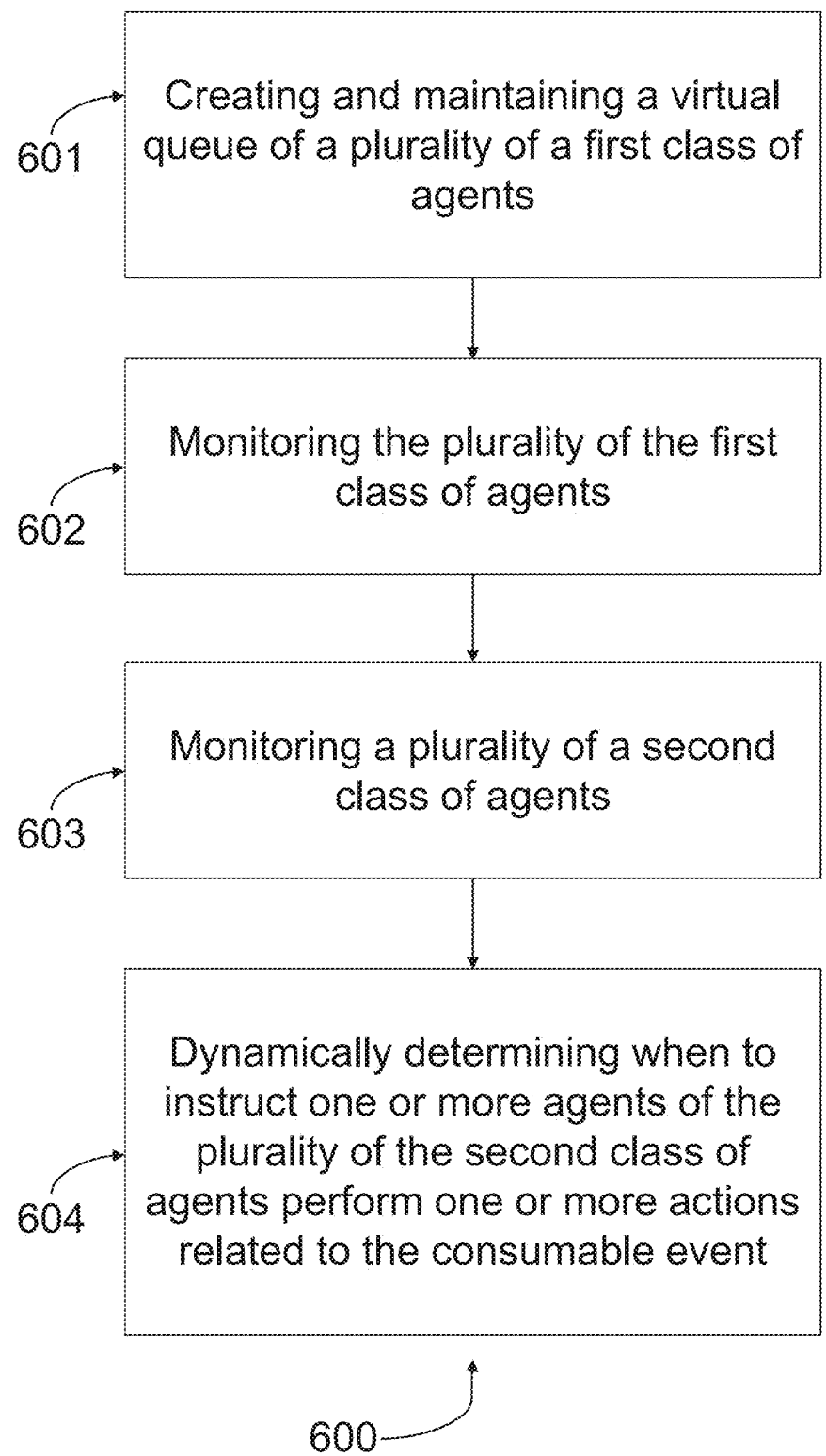
FIG. 6 shows an example of another method according to an embodiment of the present invention.

FIG. 6 reduces the above example into a method and depicts the method for maintaining a virtual queue for a plurality of a first class of agents, monitoring the plurality of the first class of agents, monitoring a plurality of a second class of agents, and dynamically determining when to instruct one or more agents of the plurality of the second class of agents to perform one or more actions related to the consumable event 600. At step 601, queue manager 102 creates one or more virtual queues when an agent of a first class of agent's mobile device 103 indicates to the system 100 via a queue application running on the mobile device 103 that the person wishes to join the virtual queue for a first consumable event 105 and maintains the virtual queue by continuing to add agents of the plurality of the first class of agents sequentially to the virtual queue. At step 602, as discussed above, the queue manager 102 communicates with a plurality of mobile devices, each mobile device associated with an agent of the plurality of the first class of agents, in order to monitor the plurality of the first class of agents. At step 603, also discussed above, the queue manager 102 communicates with each of a plurality of a second class of agents, in order to monitor the plurality of the second class of agents. At step 604, the queue manager 102 dynamically determines when to instruct one or more agents of the plurality of the second class of agents to perform one or more actions related to the consumable event, such as a transporting the one or more agents of the plurality of the first class of agents to a consumable event or venue, based on the different ways the queue manager 102 monitors the first class of agents and the different ways the queue manager 102 monitors the second class of agents.

In another non-limiting example of the queue manager 102 determining a convenient time to summon agents of a second class of agents to perform actions that further expands on the cleaning robot example discussed above, the system 100 may dynamically adjust how cleaning robots perform their cleaning tasks. In addition to the queue manager 102 being sent an update from the consumable event 105 when agents suddenly leave or depart from a consumable event 105 unexpectedly early, the system 100 may receive data defining consumable event space utilisation schedule from the consumable event 105 or venue 104 of how a consumable event space will next be used and may summon cleaning robots to improve their cleaning routines by dynamically adjusting how the robots perform. For example, the queue manager 102 may have the cleaning robots perform quick cleans rather than extended thorough cleans or vice versa given the time availability for utilising a consumable event space and the number of available robots. The queue manager 102 may determine which robots are summoned and how the robots interact with one another or are allocated to the available consumable event space. The queue manager 102 may also track what the cleaning robots were doing before being summoned, such as if a robot was actively completing another task, what sort of task the robot was doing, and how far along the task the robot was, and how long the cleaning robots would take to transit from its current location to the consumable event space. The queue manager 102 may consider the dynamic nature of these variables as robot transit time is impacted by other agent or traffic of people who are not queued for a consumable event and the time to complete a cleaning task may be impacted by the changes to the physical layout of consumable event 105 or event or activity that does not require queueing for space, e.g., the distribution of tables and chairs and the mess created as a result of a wedding with 100 guests is different from that of a wedding with 200 guests.

Figure 7:
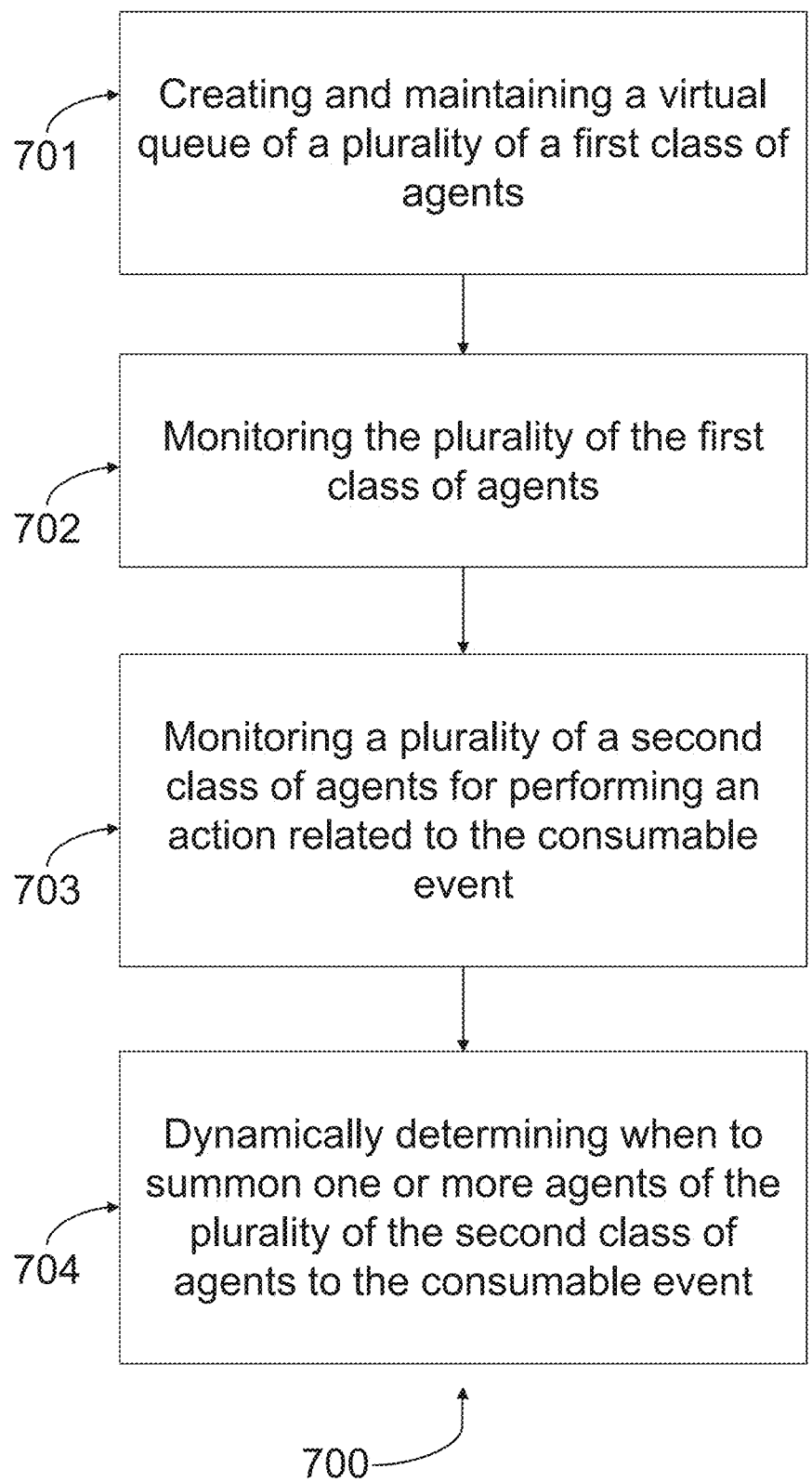
FIG. 7 shows an example of yet another method according to an embodiment of the present invention.

FIG. 7 reduces the above example into a method and depicts the method for maintaining a virtual queue for a plurality of a first class of agents, monitoring the plurality of the first class of agents, monitoring a plurality of a second class of agents for performing an action related to the consumable event, and dynamically determining when to summon one or more agents of the plurality of the second class of agents to the consumable event 700. At step 701, the queue manager 102 creates a virtual queue when an agent's mobile device 103 indicates to the system 100 via a queue application running on the mobile device 103 that the person wishes to join the virtual queue for a consumable event 105 and maintains the virtual queue by continuing to add agents sequentially to the virtual queue. At step 702, the queue manager communities with a plurality of mobile devices, each associated with an agent of the plurality of the first class of agents, in order to monitor the plurality of the first class of agents. At step 703, also discussed above, the queue manager 102 communicates with each of a plurality of a second class of agents, in order to monitor the plurality of the second class of agents, where the second class of agents are for performing an action related to the consumable event. At step 704, the queue manager 102 dynamically determines when to summon one or more agents of the plurality of the second class of agents to the consumable event based on the different ways the queue manager 102 monitors the first class of agents, the different ways the queue manager 102 monitors the second class of agents.

EXAMPLE

A prototype implementation of an embodiment of system 100 was trialled in respect of an exhibit at a museum and resulted in significant decreases in physical queue wait times. The trial was implemented in respect of an exhibit where only two people were permitted to enter the exhibit at a time. Entry to the exhibit was near the entrance to the museum and was controlled by an event staff member. People typically took 3-5 minutes inside the exhibit before exiting the exhibit. Prior to trialling the system, average wait times for the physical queue to the exhibit were measured and it was determined that the physical queue to see the exhibit had an average wait time of 26 minutes and a wait time in excess of 45 minutes during peak hours.

During the trial, people downloaded the queueing application onto their own mobile devices or were provided a device with the queueing application preloaded onto it. People were monitored using location beacons located at the exhibit and at different locations throughout the museum, as well as via Wi-Fi available throughout. The queueing application calculated when to summon agents to the exhibit based on agent activity and interactions with their mobile devices, agent preferences, agent location and movement data, and the rates at which agents moved through the exhibit.

After trialling the system 100 over a period of time, the average wait time in the physical queue dropped to 6.21 minutes. Over the course of the trial period, the system 100 served 14,242 people and saved 5,395 hours of people waiting in the physical queue relative to the prior average, when time saved was measured from the time an agent joined the virtual queue to the time the agent was summoned to the exhibit.

In one example embodiment, there is provided a method, the method comprising:

maintaining, by a queue manager, a virtual queue, in a memory, for a consumable event, the virtual queue defining a current order of a plurality of agents; communicating, by the queue manager, with a plurality of mobile devices, each mobile device of the plurality of mobile devices associated with an agent of the plurality of agents, in order to monitor the associated agent; and dynamically determining, by the queue manager when to summon one or more agents of the plurality of agents in the virtual queue to the consumable event based on the monitoring of the plurality of agents.

In another example embodiment, there is provided a method, the method comprising:

maintaining, by a queue manager, a virtual queue, in a memory, for a consumable event, the virtual queue defining a current order of a plurality of a first class of agents;

communicating, by the queue manager, with a plurality of mobile devices, each mobile device of the plurality of mobile devices associated with an agent of the plurality of the first class of agents, in order to monitor the plurality of the first class of agents;

communicating, by the queue manager, with each agent of a plurality of a second class of agents in order to monitor the plurality of the second class of agents; and dynamically determining, by the queue manager, when to instruct one or more agents of the plurality of the second class of agents to perform one or more actions related to the consumable event based on the monitoring of the plurality of the first class of agents and the monitoring of the plurality of the second class of agents.

In yet another example embodiment, there is provided a method, the method comprising:

maintaining, by a queue manager, a virtual queue, in a memory, for a consumable event, the virtual queue defining a current order of a plurality of a first class of agents;

communicating, by the queue manager, with a plurality of mobile devices, each mobile device of the plurality of mobile devices associated with an agent of the plurality of the first class of agents, in order to monitor the plurality of the first class of agents;

communicating, by the queue manager, with each agent of a plurality of a second class of agents in order to monitor the plurality of the second class of agents, the second class of agents being for performing an action related to the consumable event; and dynamically determining, by the queue manager, when to summon one or more agents of the plurality of the second class of agents to the consumable event based on the monitoring of the plurality of the first class of agents and the monitoring of the plurality of the second class of agents.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A virtual queuing system comprising:
a memory; and
a queue manager configured to:
maintain a plurality of virtual queues in the memory, each virtual queue associated with one of a plurality of consumable events, each virtual queue defining a current order of a plurality of agents assigned to the particular virtual queue, wherein the queue manager adds a particular agent to a particular virtual queue in response to determining an intention of the particular agent to join the particular virtual queue,
communicate with a plurality of mobile devices, each mobile device of the plurality of mobile devices associated with an agent of the plurality of agents,
monitor said mobile devices by receiving information from or about each mobile device at least in part via said communication with said mobile devices,
dynamically determine when to summon one or more agents of the plurality of agents in a particular virtual queue to a particular consumable event based on the monitoring of the mobile devices of the plurality of agents by:
assigning, to each agent, a determined agent score at the time of said agent being added to a particular virtual queue, said agent score associated with the particular virtual queue, said agent scores being stored in the memory;
repeatedly determining, for each mobile device, a current location of the mobile device based on either or both of: a detection of the mobile device by one of a plurality of location beacons each associated with a different location related to the plurality of consumable events; and location information received from the mobile device determined in accordance with an internal location sensor of the mobile device;
repeatedly recalculating the agent score of each agent for each respective virtual queue to thereby update said agent score according to agent score calculation factors determined from information received from or about each respective agent's mobile device,
wherein said agent scores correspond to predictions of either or both of said agent's capacity and likelihood to attend the particular consumable event associated with the particular virtual queue at the time of updating the agent score determined from said agent score calculation factors, and
wherein said recalculating includes, for each agent for each virtual queue, at least identifying a most recently determined current location of said agent's mobile device and determining, based at least on said most recently determined current location, a probable current activity of said agent associated with said mobile device and adjusting said agent score according to said determined current activity, wherein the agent score is adjusted to reflect a capability to attend the particular consumable event associated with the particular virtual queue based on said determined current activity;

determining that one or more positions at the particular consumable event are free for assignment to agents; and in response, identifying a corresponding one or more agents for assigning to the particular consumable event based on respective positions of said agents within the associated virtual queue and the current agent scores of the agents within the particular virtual queue associated with the particular consumable event, wherein an agent score must meet a predefined threshold condition to enable said agent to be assigned to the particular event, and summon the determined one or more agents for summoning via a communication with each determined agent's mobile device by causing a presentation of said summon on said one or more determined agents' mobile devices.

2. The system of claim 1, wherein the monitoring of the plurality of agents comprises tracking agent interactions with their associated mobile device, wherein the agent score is updated in dependence on a frequency of interaction by the agent with their associated mobile device as determined by said mobile device.

3. The system of claim 2, wherein tracking agent interactions with their associated mobile device comprises at least one of tracking whether the agent has seen a summon notification, whether the agent responds to the summon notification, and when the agent interacts with a component element of the consumable event, a component element of a second consumable event, or a component element of an event that does not require queueing for.

4. The system of claim 1, wherein the monitoring of the plurality of agents comprises tracking, via measurements made by each respective agent's mobile device, a rate of movement of each of the plurality of agents.

5. The system of claim 4, wherein tracking the rate of movement of each of the plurality of agents comprises tracking at least one external factor that affects the location of the agent, the rate of movement of the agent, or alternate routes from the location of the agent to the consumable event.

6. The system of claim 5, wherein the external factor comprises at least one of weather data, traffic data, public transport data, and parameters of routes between locations.

7. The system of claim 1, wherein identifying a corresponding one or more agents for assigning to the particular event is further based on at least one of specified patterns in agent behavior data and patterns in agent behavior data derived by analyzing agent behavior data using machine learning to thereby generate a profile for each agent, said agent behavior data derived, at least in part, from location data of each agent's mobile device.

8. The system of claim 1, wherein:
based on the queue manager being unable to communicate with one or more of the plurality of mobile devices, the queue manager is configured to maintain dynamically determining when to summon one or more agents of the plurality of agents in the virtual queue to the consumable event based on a last calculated agent score, and
based on the queue manager being able to communicate with the plurality of mobile devices after previously being unable to communicate with the plurality of mobile devices, the queue manager is configured to continue calculating updated agent scores for said agents.

9. The system of claim 1, wherein the queue manager is configured to dynamically determine when to summon one or more agents of the plurality of agents in the virtual queue to the consumable event based on one or more of an estimated rate of completion for agents consuming the consumable event, a rate at which agents are consuming the consumable event, a capacity of the consumable event, and an average agent event consumption rate.

10. The system of claim 1, wherein the queue manager is configured to receive one or more inputs from consumable event staff and dynamically determine when to summon one or more agents of the plurality of agents in the virtual queue to the consumable event based on the received one or more inputs.

11. The system of claim 1, wherein the agent scores calculated for each of the plurality of agents is at least in part based on tracking preferences of each respective agent.

12. The system of claim 11, wherein the tracking preferences of each agent of the plurality of agents comprise one or more of: tracking a rating each agent of the plurality of agents has attributed to a component element of the consumable event, a component element of a second consumable event, or a component element of an event that does not require queueing for, tracking whether each agent of the plurality of agents has interacted with the component element of the consumable event, the component element of the second consumable event, or the component element of the event that does not require queueing for, tracking how long each agent of the plurality of agents remains at an area of the event that does not require queueing for, tracking a schedule of each agent of the plurality of agents, and tracking preference survey responses of each agent of the plurality of agents.

13. The system of claim 1, wherein the queue manager is configured to communicate with or summon the one or more agents by sending the mobile device associated with the agent at least one of an audio directive comprising a simple voice message, audio cue, or voice messages communicated via directionally focused sound or audio spotlight techniques, a textual directive comprising a SMS message or pop-up notification, a haptic directive comprising a vibration, and a visual directive comprising a video, an image display, and an augmented reality display.

14. The system of claim 1, wherein the queue manager is configured to add one or more agents to one or more virtual queues upon detecting or inferring said agents are suitable for said virtual queues, without receiving an express indication of an interest to partake in the associate one or more consumable events.

15. The system of claim 1, wherein the calculated agent scores for a particular virtual queue are, at least in part, based on a current attendance of an agent at a second consumable event different to that associated with the particular virtual queue, such that the agent score is less likely to meet the threshold condition if the agent is attending the second consumable event.

16. A method for assigning agents to consumable events, comprising:
maintaining a plurality of virtual queues in a memory, each virtual queue associated with one of a plurality of consumable events, each virtual queue defining a current order of a plurality of agents added to the particular virtual queue;

adding agents to one or more virtual queues in response to determining an intention of the agent to join a particular virtual queue;

dynamically determining when to summon one or more agents of the plurality of agents in the particular virtual queue to a particular consumable event based on the monitoring of the plurality of agents by:

assigning, to each agent, a determined agent score at the time of said agent being added to the particular virtual queue, said agent score associated with the particular virtual queue;

communicating with a plurality of mobile devices, each mobile device of the plurality of mobile devices associated with an agent of the plurality of agents in order to monitor the agent associated with each mobile device to thereby monitor said mobile devices by receiving information from or about each mobile device at least in part via said communication with said mobile devices;

repeatedly determining, for each mobile device, a current location of the respective mobile device based on either or both of: a detection of the mobile device by one of a plurality of location beacons each associated with a different location related to the plurality of consumable events; and location information received from the mobile device determined in accordance with an internal location sensor of the mobile device;

repeatedly calculating the agent score of each agent for each respective virtual queue to thereby update said agent score according to agent score calculation factors determined from information received from or about each respective agent's mobile device, wherein said agent scores correspond to predictions of either or both of said agent's capacity and likelihood to attend the particular consumable event associated with the particular virtual queue at the time of updating the agent score determined from said agent score calculation factors, wherein said calculating includes, for each agent for each virtual queue, at least identifying a most recently determined current location of said agent's mobile device and determining, at least based on said most recently determined current location, a probable current activity of said agent associated with said mobile device and adjusting said agent score according to said determined current activity, wherein the agent score is adjusted to reflect a capability to attend the particular consumable event associated with the particular virtual queue based on said determined current activity;

determining that one or more positions at the particular consumable event are free for assignment to agents; and in response, identifying a corresponding one or more agents for assigning to the particular consumable event based on respective positions of said agents within the associated virtual queue and the current agent scores of the agents within the particular virtual queue associated with the particular consumable event, wherein an agent score must meet a predefined threshold condition to enable said agent to be assigned to the particular event, summoning the determined one or more agents for summoning via a communication with each determined agent's mobile device, by causing a presentation of said summon on said one or more determined agents' mobile devices.

17. The system of claim 1, wherein the agent score calculation factors comprise determining a direction of movement of said agent from the received location information associated with said agent's mobile device, such that movement away from the particular consumable event of the particular virtual queue has an effect of reducing the calculated agent score.

18. The system of claim 1, wherein, for the particular virtual queue, the agent score is reduced when the queue manager determines that the current location of a mobile device is associated with a location of a different consumable event to that of the particular virtual queue and thereby determines that the probable current activity of the agent is attendance at the different consumable event, wherein attendance at said different consumable event represents a reduced likelihood of said agent attending the particular consumable event of the particular virtual queue.

19. The system of claim 7, wherein the queue manager is configured to:

repeatedly determine agent behavior data and store said determined agent behavior data in a history database; and utilize machine learning to process and develop predictive agent behavior for each agent, where said predictive agent behavior is continuously updated based on historical agent behavior data and currently determined agent behavior data, wherein said identifying one or more agents for assigning to the particular consumable event is further based on the updated predictive agent behavior.

20. The system of claim 1, wherein said determined current activity is selected from a predefined group of activities comprising at least one or more first activities, each associated with the agent engaging with another consumable event different to that associated with the particular virtual queue, wherein the agent score is lowered in response to determining that the current activity of the agent is one of the first activities.

21. The system of claim 20, wherein adjusting said agent score according to said determined current activity comprises, when said current activity is a first activity, predicting a time to completion of the determined current activity and predicting a length of time for the agent to arrive at the particular event in dependence on the predicted time to completion.

22. An agent summoning system, comprising:
the virtual queuing system of claim 1; and
the plurality of mobile devices,
wherein each mobile device is configured to generate, in response to receiving a communication from the virtual queueing system indicated a summon of the agent associated with the particular mobile device, at least one of an audio directive comprising a simple voice message, audio cue, or voice messages communicated via directionally focused sound or audio spotlight techniques, a textual directive comprising a SMS message or pop-up notification, a haptic directive comprising a vibration, and a visual directive comprising a video, an image display, and an augmented reality display.

23. A virtual queuing system comprising:
a memory; and
a queue manager configured to:
maintain a plurality of virtual queues in the memory, each virtual queue associated with one of a plurality of consumable events, each virtual queue defining a current order of a plurality of agents of a first class of agents assigned to the particular virtual queue, wherein the queue manager adds a particular agent of the first class of agents to a particular virtual queue in response to determining an intention of the particular agent to join the particular virtual queue, communicate with a plurality of mobile devices, each mobile device of the plurality of mobile devices associated with an agent of the plurality of first class of agents, wherein the queue manager thereby monitors said mobile devices by receiving information from or about each mobile device at least in part via said communication with said mobile devices, and dynamically determine when to summon one or more agents of the plurality of first class of agents in a particular virtual queue to a particular consumable event based on the monitoring of the mobile devices of the plurality of agents of the first class of agents by:

assigning, to each agent of the first class of agents, a determined agent score at the time of said agent being added to the particular virtual queue, said agent score associated with the particular virtual queue, said agent scores being stored in the memory;

repeatedly determining, for each mobile device, a current location of the mobile device based on either or both of: a detection of the mobile device by one of a plurality of location beacons each associated with a different location related to the plurality of consumable events; and location information received from the mobile device determined in accordance with an internal location sensor of the mobile device;

repeatedly recalculating the agent score of each agent of the first class of agents for each respective virtual queue to thereby update said agent score according to agent score calculation factors determined from information received from or about each respective agent's mobile device, wherein said agent scores correspond to predictions of either or both of said agent's capacity and likelihood to attend the particular consumable event associated with the particular virtual queue at the time of updating the agent score determined from said agent score calculation factors, and wherein said recalculating includes, for each agent of the first class of agents for each virtual queue, at least identifying a most recently determined current location of said agent's mobile device and determining, at least based on said most recently determined current location, a probable current activity of said agent associated with said mobile device and adjusting said agent score according to said determined current activity, wherein the agent score is adjusted to reflect a capability to attend the particular consumable event associated with the particular virtual queue based on said determined current activity;

determining that one or more positions at the particular consumable event are free for assignment to agents of the first class of agents; and in response, identifying a corresponding one or more agents of the first class of agents for assigning to the particular consumable event based on respective positions of said agents within the associated virtual queue and the current agent scores of said agents within the particular virtual queue associated with the particular consumable event, wherein an agent score must meet a predefined threshold condition to enable said agent to be assigned to the particular event, wherein the queue manager is configured to summon the determined one or more agents for summoning via a communication with each determined agent's mobile device, by causing a presentation of said summon on said one or more determined agents' mobile devices, wherein the queue manager is configured to further output an instruction to one or more agents of a plurality of a second class of agents configured to perform one or more actions related to the particular consumable event, wherein the queue manager is configured to communicate with the plurality of the second class of agents, wherein the queue manager is configured to communicate with each agent of the plurality of the second class of agents in order to monitor the plurality of the second class of agents, wherein the queue manager is configured to dynamically determine when to output an instruction to one or more agents of the plurality of the second class of agents to perform the one or more actions based on the monitoring of the plurality of the first class of agents and the monitoring of the plurality of the second class of agents.

* * * * *